United States Patent
Chen et al.

(10) Patent No.: US 10,904,750 B2
(45) Date of Patent: Jan. 26, 2021

(54) KEY OBTAINING METHOD AND DEVICE, AND COMMUNICATIONS SYSTEM

(71) Applicant: Huawei Technologies Co., Ltd., Shenzhen (CN)

(72) Inventors: Jing Chen, Shanghai (CN); Kai Pan, Shanghai (CN); He Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/383,087

(22) Filed: Apr. 12, 2019

(65) Prior Publication Data

US 2019/0268753 A1     Aug. 29, 2019

Related U.S. Application Data

(63) Continuation of application No. PCT/CN2017/083072, filed on May 4, 2017.

(51) Int. Cl.
*H04W 8/08*     (2009.01)
*H04W 12/04*     (2009.01)
(Continued)

(52) U.S. Cl.
CPC ......... *H04W 12/0401* (2019.01); *H04W 8/08* (2013.01); *H04W 12/04031* (2019.01);
(Continued)

(58) Field of Classification Search
None
See application file for complete search history.

(56) References Cited

U.S. PATENT DOCUMENTS

| | | | |
|---|---|---|---|
| 2002/0197979 A1* | 12/2002 | Vanderveen | H04L 63/0869 455/410 |
| 2006/0019663 A1* | 1/2006 | Cuffaro | H04W 36/0061 455/436 |

(Continued)

FOREIGN PATENT DOCUMENTS

| | | |
|---|---|---|
| CN | 101322428 A | 12/2008 |
| CN | 101516089 A | 8/2009 |

(Continued)

OTHER PUBLICATIONS

Machine Translation and Abstract of Chinese Publication No. CN101516089, Aug. 26, 2009, 16 pages.

(Continued)

*Primary Examiner* — Hassan A Phillips
*Assistant Examiner* — Gautam Sharma
(74) *Attorney, Agent, or Firm* — Conley Rose, P.C.

(57) ABSTRACT

In a method for security handling in a mobility of a terminal device, a target access and mobility management function (AMF) entity receives a first message for registering a terminal device, sends a second message to a source AMF entity after receiving the first message. The source AMF entity derives a first key based on a key between the source AMF entity and the terminal device, sends the first key to the target AMF entity. The target AMF entity determines to use the first key based on security related information after receiving the first key and determines a communication key between the target AMF entity and the terminal device based on the first key after determining to use the first key.

24 Claims, 12 Drawing Sheets

(51) Int. Cl.
  *H04W 76/25* (2018.01)
  *H04W 12/06* (2009.01)
  *H04W 60/00* (2009.01)
  *H04W 76/11* (2018.01)

(52) U.S. Cl.
  CPC ............... *H04W 12/04033* (2019.01); *H04W 12/04071* (2019.01); *H04W 12/06* (2013.01); *H04W 60/00* (2013.01); *H04W 76/11* (2018.02); *H04W 76/25* (2018.02)

(56) References Cited

U.S. PATENT DOCUMENTS

| | | | |
|---|---|---|---|
| 2008/0273704 A1 | 11/2008 | Norrman et al. | |
| 2008/0318546 A1* | 12/2008 | Kitazoe | H04L 63/068 455/410 |
| 2010/0067697 A1* | 3/2010 | Casati | H04L 63/0428 380/270 |
| 2010/0130207 A1* | 5/2010 | Wu | H04W 36/0033 455/436 |
| 2011/0080875 A1 | 4/2011 | Yang et al. | |
| 2011/0123029 A1* | 5/2011 | Zhang | H04W 12/04 380/272 |
| 2011/0142239 A1* | 6/2011 | Suh | H04W 12/02 380/270 |
| 2011/0261961 A1* | 10/2011 | Dharmaraju | H04W 12/04 380/277 |
| 2012/0003962 A1* | 1/2012 | Jeon | H04W 36/0085 455/411 |
| 2012/0210397 A1* | 8/2012 | Suh | H04W 12/06 726/3 |
| 2012/0294444 A1 | 11/2012 | Feng et al. | |
| 2013/0083773 A1* | 4/2013 | Watfa | H04W 36/0033 370/331 |
| 2013/0128866 A1* | 5/2013 | Zhang | H04W 12/06 370/331 |
| 2013/0143532 A1 | 6/2013 | Liu | |
| 2013/0288642 A1 | 10/2013 | Yang | |
| 2014/0241317 A1* | 8/2014 | Jamadagni | H04L 5/0032 370/331 |
| 2014/0337935 A1* | 11/2014 | Liu | H04W 12/04 726/4 |
| 2015/0082393 A1* | 3/2015 | Chen | H04W 84/12 726/4 |
| 2016/0127896 A1 | 5/2016 | Lee et al. | |
| 2019/0141584 A1* | 5/2019 | Ben Henda | H04W 12/04033 |

FOREIGN PATENT DOCUMENTS

| | | |
|---|---|---|
| CN | 102056160 A | 5/2011 |
| CN | 102065424 A | 5/2011 |
| CN | 102348206 A | 2/2012 |
| CN | 104917605 A | 9/2015 |
| EP | 2109278 A1 | 10/2009 |
| EP | 2271145 A1 | 1/2011 |
| EP | 2315371 A2 | 4/2011 |
| KR | 20100021385 A | 2/2010 |
| WO | 2008046915 A1 | 4/2008 |

OTHER PUBLICATIONS

Machine Translation and Abstract of Chinese Publication No. CN102056160, May 11, 2011, 34 pages.
Machine Translation and Abstract of Chinese Publication No. CN104917605, Sep. 16, 2015, 47 pages.
"3rd Generation Partnership Project; Technical Specification Group Services and System Aspects; System Architecture for the 5G System; Stage 2 (Release 15)," 3GPP TS 23.501, V0.4.0, Apr. 2017, 124 pages.
"3rd Generation Partnership Project; Technical Specification Group Services and System Aspects; Procedures for the 5G System; Stage 2 (Release 15)," 3GPP TS 23.502, V0.3.0, Mar. 2017, 115 pages.
Samsung, "Registration procedure using the temporary User ID," SA WG2 Meeting #120, S2-171911 (revision of S2-17xxxx), Mar. 27-31, 2017, 11 pages.
Foreign Communication From a Counterpart Application, PCT Application No. PCT/CN2017/083072, English Translation of International Search Report dated Jan. 26, 2018, 2 pages.
Foreign Communication From a Counterpart Application, Chinese Application No. 201811522112.8, Chinese Office Action dated Aug. 22, 2019, 10 pages.
"Key refresh on Inter MME handover," XP008145163, 3GPP TR33.821 V0.8.0, Apr. 22, 2008, 4 pages.
Foreign Communication From a Counterpart Application, European Application No. 17908591.5, Extended European Search Report dated Feb. 21, 2020, 8 pages.

\* cited by examiner

KEY OBTAINING METHOD AND DEVICE, AND COMMUNICATIONS SYSTEM

CROSS-REFERENCE TO RELATED APPLICATIONS

This application is a continuation of International Patent Application No. PCT/CN2017/083072, filed on May 4, 2017, which is hereby incorporated by reference in its entirety.

TECHNICAL FIELD

Embodiments of this application relate to communications technologies, and in particular, to a key obtaining method and device, and a communications system.

BACKGROUND

With the development of communications technologies, communication security attracts increasing attention. Currently, communication security is usually ensured through encryption protection and integrity protection.

In a Long Term Evolution (LTE) system, a termination point of a non access stratum (NAS) is a mobility management entity (MME), and is mainly responsible for mobility management, bearer management, user authentication, serving gateway (S-GW) selection, packet data network gateway (P-GW) selection, and the like. In LTE, if an MME accessed by a user equipment (UE) changes because a location of the UE changes (herein, the location of the UE in an idle state changes), a source MME needs to send a security context of the UE to a target MME, and then a communication key between the source MME and the UE is used between the target MME and the UE.

In a 5th generation mobile communications (5G) system, an access and mobility management function (AMF) entity is a termination point of a NAS, and is mainly responsible for registration, connection, mobility management, subscription information authentication, and the like that are of UE. When an AMF entity accessed by UE changes because a location of the UE changes (herein, the location of the UE in an idle state changes), a source AMF entity needs to send a security context of the UE stored in the source AMF entity to a target AMF entity, such that the UE and the target AMF entity can continue communication.

It can be learned that transfer of a security context from one entity to another entity exists in both LTE and a next generation network, and a key between a target entity and UE is the same as a key between a source entity and the UE. This may pose a security risk.

SUMMARY

Embodiments of this application provide a plurality of key obtaining methods and devices, and a plurality of communications systems, to improve network security.

According to a first aspect, an embodiment of this application provides a key obtaining method performed by a target AMF entity. The method includes receiving, by the target AMF entity, a first message, where the first message is used to request to register a terminal device; sending, by the target AMF entity, a second message to a source AMF entity based on the first message, where the second message includes an identifier of the terminal device; receiving, by the target AMF entity, a third message from the source AMF entity, where the third message is used to respond to the second message, the third message carries a first key, and the first key is obtained by the source AMF entity through derivation based on a key between the source AMF entity and the terminal device; and determining, by the target AMF entity, a communication key between the target AMF entity and the terminal device based on security related information and the first key.

In the key obtaining method provided above, the target AMF entity determines the communication key between the target AMF entity and the terminal device based on the security related information using an intermediate key sent by the source AMF entity. The intermediate key is obtained by the source AMF entity through derivation based on the key between the source AMF entity and the terminal device, and therefore the target AMF entity cannot learn of a communication key used between the source AMF entity and the terminal device. In this way, key isolation is achieved between the target AMF entity and the source AMF entity, thereby effectively avoiding a security risk and improving communication security.

In a possible design, the method further includes sending, by the target AMF entity, a NAS security mode command (SMC) to the terminal device, where the NAS SMC carries indication information, and the indication information is used to indicate the terminal device to derive the communication key between the terminal device and the target AMF entity based on the key between the source AMF entity and the terminal device.

Optionally, the security related information includes: a preconfigured policy, where the policy is used to indicate to use a key received from the source AMF entity, or the policy is used to indicate to use a key received from an authentication function entity; or key isolation information of the target AMF entity, where the key isolation information is used to indicate whether a key of the target AMF entity is totally isolated from a key of the source AMF entity; or a security status of the source AMF entity, where the security status is used to indicate whether the source AMF entity is secure.

Further, determining, by the target AMF entity, a communication key between the target AMF entity and the terminal device based on security related information and the first key includes determining, by the target AMF entity, the communication key between the target AMF entity and the terminal device based on the first key when the security related information is the preconfigured policy and the policy is used to indicate to use the key received from the source AMF entity, or when the security related information is the key isolation information of the target AMF entity and the key isolation information is used to indicate that the key of the target AMF entity is not totally isolated from the key of the source AMF entity, or when the security related information is the security status of the source AMF entity and the security status is used to indicate that the source AMF entity is secure. Alternatively, determining, by the target AMF entity, a communication key between the target AMF entity and the terminal device based on security related information and the first key includes determining, by the target AMF entity, the communication key between the target AMF entity and the terminal device based on the first key when the target AMF entity determines, based on the security related information, to use the key received from the source AMF entity.

Optionally, that the target AMF entity determines, based on the security related information, to use the key received from the source AMF entity includes determining, by the target AMF entity, to use the key received from the source AMF entity when the security related information is the preconfigured policy and the policy is used to indicate to use the key received from the source AMF entity. Alternatively, the target AMF entity determines to use the key received from the source AMF entity when the security related information is the key isolation information of the target AMF entity and the key isolation information is used to indicate that the key of the target AMF entity is not totally isolated from the key of the source AMF entity. Alternatively, the target AMF entity determines to use the key received from the source AMF entity when the security related information is the security status of the source AMF entity and the security status is used to indicate that the source AMF entity is secure.

Optionally, determining, by the target AMF entity, the communication key between the target AMF entity and the terminal device based on the first key includes using, by the target AMF entity, the first key as the communication key between the target AMF entity and the terminal device. Alternatively, determining, by the target AMF entity, the communication key between the target AMF entity and the terminal device based on the first key includes deriving, by the target AMF entity, the communication key between the target AMF entity and the terminal device based on the first key and a random number of the terminal device. Alternatively, determining, by the target AMF entity, the communication key between the target AMF entity and the terminal device based on the first key includes deriving, by the target AMF entity, the communication key between the target AMF entity and the terminal device based on the first key and a random number of the target AMF entity. Alternatively, determining, by the target AMF entity, the communication key between the target AMF entity and the terminal device based on the first key includes deriving, by the target AMF entity, a second key using a key exchange algorithm based on a random number of the target AMF entity and a random number of the terminal device, and deriving the communication key between the target AMF entity and the terminal device based on the first key and the second key. Alternatively, determining, by the target AMF entity, the communication key between the target AMF entity and the terminal device based on the first key includes deriving, by the target AMF entity, a second key using a key exchange algorithm based on a random number of the target AMF entity and a random number of the terminal device, deriving a third key based on the first key and the random number of the target AMF entity, and deriving the communication key between the target AMF entity and the terminal device based on the second key and the third key.

In a possible design, the first key is obtained by the source AMF entity through derivation based on the key between the source AMF entity and the terminal device and the random number of the terminal device.

In a possible design, the first key is obtained by the source AMF entity through derivation based on the key between the source AMF entity and the terminal device and a random number of the source AMF entity.

In a possible design, the key between the source AMF entity and the terminal device includes a communication key between the source AMF entity and the terminal device or a key shared between the source AMF entity and the terminal device. Additionally, the key shared between the source AMF entity and the terminal device is a master session key (MSK), or a key generated based on an MSK, or a key generated based on a cipher key (CK) and an integrity key (IK).

According to a second aspect, an embodiment of this application provides a key obtaining method performed by a target AMF entity. The method includes receiving, by the target AMF entity, a first message, where the first message is used to request to register a terminal device; sending, by the target AMF entity, a second message to a source AMF entity based on the first message, where the second message includes an identifier of the terminal device; receiving, by the target AMF entity, a third message from the source AMF entity, where the third message is used to respond to the second message; sending, by the target AMF entity, a fourth message to an authentication function entity based on the third message, where the fourth message is used to request a key, and the fourth message includes the identifier of the terminal device; receiving, by the target AMF entity, a fifth message from the authentication function entity, where the fifth message carries a first key, and the first key is obtained by the authentication function entity through derivation based on a key shared between the authentication function entity and the terminal device; and determining, by the target AMF entity, a communication key between the target AMF entity and the terminal device based on the first key.

In the key obtaining method provided above, the target AMF entity directly requests a new key from the authentication function entity to determine the communication key between the target AMF entity and the terminal device. In this way, key isolation is achieved between the target AMF entity and the source AMF entity, thereby effectively avoiding a security risk and improving communication security.

In a possible design, the method further includes sending, by the target AMF entity, a non access stratum security mode command NAS SMC to the terminal device, where the NAS SMC carries indication information, and the indication information is used to indicate the terminal device to derive the communication key between the terminal device and the target AMF entity based on the key shared between the authentication function entity and the terminal device.

In a possible design, sending, by the target AMF entity, a fourth message to an authentication function entity includes sending, by the target AMF entity, the fourth message to the authentication function entity based on security related information. Alternatively, the target AMF entity sends the fourth message to the authentication function entity when the target AMF entity determines, based on the security related information, not to use a key received from the source AMF entity.

Optionally, the security related information includes: a preconfigured policy, where the policy is used to indicate to use the key received from the source AMF entity, or the policy is used to indicate to use a key received from the authentication function entity; or key isolation information of the target AMF entity, where the key isolation information is used to indicate whether a key of the target AMF entity is totally isolated from a key of the source AMF entity; or a security status of the source AMF entity, where the security status is used to indicate whether the source AMF entity is secure.

Further, sending, by the target AMF entity, the fourth message to the authentication function entity based on security related information includes sending, by the target AMF entity, the fourth message to the authentication function entity when the security related information is the preconfigured policy and the policy is used to indicate to use the key received from the authentication function entity. Alternatively, the target AMF entity sends the fourth message to the authentication function entity when the security related information is the key isolation information of the target AMF entity and the key isolation information is used to indicate that the key of the target AMF entity is totally isolated from the key of the source AMF entity. Alternatively, the target AMF entity sends the fourth message to the authentication function entity when the security related information is the security status of the source AMF entity and the security status is used to indicate that the source AMF entity is not secure.

Optionally, that the target AMF entity determines, based on the security related information, not to use a key received from the source AMF entity includes determining, by the target AMF entity, not to use the key received from the source AMF entity when the security related information is the preconfigured policy and the policy is used to indicate to use the key received from the authentication function entity. Alternatively, the target AMF entity determines, based on the security related information, not to use the key received from the source AMF entity when the security related information is the key isolation information of the target AMF entity and the key isolation information is used to indicate that the key of the target AMF entity is totally isolated from the key of the source AMF entity. Alternatively, the target AMF entity determines, based on the security related information, not to use the key received from the source AMF entity when the security related information is the security status of the source AMF entity and the security status is used to indicate that the source AMF entity is not secure.

In a possible design, determining, by the target AMF entity, a communication key between the target AMF entity and the terminal device based on the first key includes using, by the target AMF entity, the first key as the communication key between the target AMF entity and the terminal device. Alternatively, determining, by the target AMF entity, a communication key between the target AMF entity and the terminal device based on the first key includes deriving, by the target AMF entity, the communication key between the target AMF entity and the terminal device based on the first key and a random number of the target AMF entity; or deriving, by the target AMF entity, a second key using a key exchange algorithm based on a random number of the target AMF entity and a random number of the terminal device, and deriving the communication key between the target AMF entity and the terminal device based on the first key and the second key; or deriving, by the target AMF entity, the communication key between the target AMF entity and the terminal device based on the first key and a random number of the terminal device; or deriving, by the target AMF entity, a second key using a key exchange algorithm based on a random number of the target AMF entity and a random number of the terminal device, deriving a third key based on the first key and the random number of the target AMF entity, and deriving the communication key between the target AMF entity and the terminal device based on the second key and the third key.

In a possible design, the first key is obtained by the authentication function entity through derivation based on the key shared between the authentication function entity and the terminal device and the random number of the terminal device.

In a possible design, the first key is obtained by the authentication function entity through derivation based on the key shared between the authentication function entity and the terminal device and a random number of the authentication function entity.

Optionally, the first message includes the random number of the terminal device.

Optionally, the key shared between the authentication function entity and the terminal device is an extended master session key (EMSK), or a key generated based on an EMSK, or a key generated based on a cipher key CK and an integrity key IK.

According to a third aspect, an embodiment of this application provides a key obtaining method performed by a terminal device. The method includes receiving, by the terminal device, a non access stratum security mode command NAS SMC sent by a target AMF entity, where the NAS SMC carries indication information, and the indication information is used to indicate the terminal device to derive a communication key between the terminal device and the target AMF entity based on a key between the terminal device and a source AMF entity, or the indication information is used to indicate the terminal device to derive a communication key between the terminal device and the target AMF entity based on a key shared between the terminal device and an authentication function entity; and determining, by the terminal device, the communication key between the terminal device and the target AMF entity according to the indication information.

In the key obtaining method provided above, the terminal device derives a corresponding key according to the NAS SMC sent by the target AMF entity, such that the communication key between the terminal device and the target AMF entity is isolated from a communication key between the terminal device and the source AMF entity, thereby effectively avoiding a security risk and improving communication security.

In a first possible design, determining, by the terminal device, the communication key between the terminal device and the target AMF entity according to the indication information is such that when the indication information is used to indicate the terminal device to derive the communication key between the terminal device and the target AMF entity based on the key between the terminal device and the source AMF entity, the terminal device derives a first key based on the key between the terminal device and the source AMF entity, and uses the first key as the communication key between the terminal device and the target AMF entity. Alternatively, determining, by the terminal device, the communication key between the terminal device and the target AMF entity according to the indication information is such that when the indication information is used to indicate the terminal device to derive the communication key between the terminal device and the target AMF entity based on the key shared between the terminal device and the authentication function entity, the terminal device derives a second key based on the key shared between the terminal device and the authentication function entity, and uses the second key as the communication key between the terminal device and the target AMF entity.

In a second possible design, the NAS SMC further carries a random number of the target AMF entity. The determining, by the terminal device, the communication key between the terminal device and the target AMF entity according to the indication information is such that when the indication information is used to indicate the terminal device to derive the communication key between the terminal device and the target AMF entity based on the key between the terminal device and the source AMF entity, the terminal device derives a first key based on the key between the terminal device and the source AMF entity, and derives the communication key between the terminal device and the target AMF entity based on the first key and the random number of the target AMF entity. Alternatively, determining, by the terminal device, the communication key between the terminal device and the target AMF entity according to the indication information is such that when the indication information is used to indicate the terminal device to derive the communication key between the terminal device and the target AMF entity based on the key shared between the terminal device and the authentication function entity, the terminal device derives a second key based on the key shared between the terminal device and the authentication function entity, and derives the communication key between the terminal device and the target AMF entity based on the second key and the random number of the target AMF entity.

In a third possible design, the NAS SMC further carries a random number of the terminal device. The determining, by the terminal device, the communication key between the terminal device and the target AMF entity according to the indication information is such that when the indication information is used to indicate the terminal device to derive the communication key between the terminal device and the target AMF entity based on the key between the terminal device and the source AMF entity, the terminal device derives a first key based on the key between the terminal device and the source AMF entity, and derives the communication key between the terminal device and the target AMF entity based on the first key and the random number of the terminal device. Alternatively, determining, by the terminal device, the communication key between the terminal device and the target AMF entity according to the indication information is such that when the indication information is used to indicate the terminal device to derive the communication key between the terminal device and the target AMF entity based on the key shared between the terminal device and the authentication function entity, the terminal device derives a second key based on the key shared between the terminal device and the authentication function entity, and derives the communication key between the terminal device and the target AMF entity based on the second key and the random number of the terminal device.

In a fourth possible design, the NAS SMC further carries a random number of the terminal device and a random number of the target AMF entity. The determining, by the terminal device, the communication key between the terminal device and the target AMF entity according to the indication information is such that when the indication information is used to indicate the terminal device to derive the communication key between the terminal device and the target AMF entity based on the key between the terminal device and the source AMF entity, the terminal device derives a first key based on the key between the terminal device and the source AMF entity, derives a third key using a key exchange algorithm based on the random number of the target AMF entity and the random number of the terminal device, and derives the communication key between the terminal device and the target AMF entity based on the first key and the third key. Alternatively, determining, by the terminal device, the communication key between the terminal device and the target AMF entity according to the indication information is such that when the indication information is used to indicate the terminal device to derive the communication key between the terminal device and the target AMF entity based on the key shared between the terminal device and the authentication function entity, the terminal device derives a second key based on the key shared between the terminal device and the authentication function entity, derives a third key using a key exchange algorithm based on the random number of the target AMF entity and the random number of the terminal device, and derives the communication key between the terminal device and the target AMF entity based on the second key and the third key.

In a fifth possible design, the NAS SMC further carries a random number of the terminal device and a random number of the target AMF entity. The determining, by the terminal device, the communication key between the terminal device and the target AMF entity according to the indication information is such that when the indication information is used to indicate the terminal device to derive the communication key between the terminal device and the target AMF entity based on the key between the terminal device and the source AMF entity, the terminal device derives a first key based on the key between the terminal device and the source AMF entity, derives a fourth key based on the first key and the random number of the target AMF entity, derives a third key using a key exchange algorithm based on the random number of the target AMF entity and the random number of the terminal device, and derives the communication key between the terminal device and the target AMF entity based on the third key and the fourth key. Alternatively, determining, by the terminal device, the communication key between the terminal device and the target AMF entity according to the indication information is such that when the indication information is used to indicate the terminal device to derive the communication key between the terminal device and the target AMF entity based on the key shared between the terminal device and the authentication function entity, the terminal device derives a second key based on the key shared between the terminal device and the authentication function entity, derives a fifth key based on the second key and the random number of the target AMF entity, derives a third key using a key exchange algorithm based on the random number of the target AMF entity and the random number of the terminal device, and derives the communication key between the terminal device and the target AMF entity based on the third key and the fifth key.

Optionally, deriving, by the terminal device, a first key based on the key between the terminal device and the source AMF entity includes deriving, by the terminal device, the first key based on the key between the terminal device and the source AMF entity and the random number of the terminal device. Alternatively, deriving, by the terminal device, a first key based on the key between the terminal device and the source AMF entity includes deriving, by the terminal device, the first key based on the key between the terminal device and the source AMF entity and a random number of the source AMF entity.

Optionally, deriving, by the terminal device, a second key based on the key shared between the terminal device and the authentication function entity includes deriving, by the terminal device, the second key based on the key shared between the terminal device and the authentication function entity and the random number of the terminal device. Alternatively, deriving, by the terminal device, a second key based on the key shared between the terminal device and the authentication function entity includes deriving, by the terminal device, the second key based on the key shared between the terminal device and the authentication function entity and a random number of the authentication function entity.

Optionally, the NAS SMC further carries the random number of the authentication function entity.

In a possible design, before receiving, by the terminal device, a NAS SMC sent by a target AMF entity, the method further includes sending, by the terminal device, a first message to an access network (AN) node, where the first message is used to request to register the terminal device; or sending, by the terminal device, a first message to the target AMF entity, where the first message is used to request to register the terminal device.

Optionally, the first message carries the random number of the terminal device.

In a possible design, the key shared between the authentication function entity and the terminal device is an extended master session key (EMSK), or a key generated based on an EMSK, or a key generated based on a cipher key (CK) and an integrity key (IK). The key between the source AMF entity and the terminal device includes a communication key between the source AMF entity and the terminal device or a key shared between the source AMF entity and the terminal device, and the key shared between the source AMF entity and the terminal device is a master session key (MSK), or a key generated based on an MSK, or a key generated based on a cipher key (CK) and an integrity key (IK).

According to a fourth aspect, an embodiment of this application provides a key obtaining method performed by an authentication function entity. The method includes receiving, by the authentication function entity, a first message sent by an AMF entity, where the first message is used to request a key, and the first message includes an identifier of a terminal device; deriving, by the authentication function entity, a first key based on a key shared between the authentication function entity and the terminal device; and sending, by the authentication function entity, a second message to the AMF entity, where the second message carries the first key.

In the key obtaining method provided above, the authentication function entity provides a new key for the AMF entity, such that the AMF entity determines a communication key between the AMF entity and the terminal device based on the new key provided by the authentication function entity. In this way, key isolation is achieved between different AMF entities, thereby avoiding a security risk and improving communication security.

In a possible design, deriving, by the authentication function entity, a first key based on a key shared between the authentication function entity and the terminal device includes deriving, by the authentication function entity, the first key based on the key shared between the authentication function entity and the terminal device and a random number of the terminal device.

Optionally, the first message further includes the random number of the terminal device.

In a possible design, deriving, by the authentication function entity, a first key based on a key shared between the authentication function entity and the terminal device includes deriving, by the authentication function entity, the first key based on the key shared between the authentication function entity and the terminal device and a random number of the authentication function entity.

Optionally, the key shared between the authentication function entity and the terminal device is an extended master session key (EMSK), or a key generated based on an EMSK, or a key generated based on a cipher key (CK) and an integrity key (IK).

According to a fifth aspect, to implement the foregoing key obtaining method provided in the first aspect, an embodiment of this application provides a key obtaining apparatus, and the apparatus has a function of implementing the foregoing key obtaining method. The function may be implemented by hardware, or may be implemented by hardware executing corresponding software. The hardware or software includes one or more modules corresponding to the foregoing function.

In a possible implementation of the fifth aspect, the apparatus includes a plurality of function modules or units, configured to implement any key obtaining method in the first aspect.

According to a sixth aspect, an embodiment of this application provides an AMF entity, and a structure of the AMF entity may include a processor and a transceiver. The processor is configured to support the AMF entity in performing corresponding functions in any key obtaining method in the first aspect. The transceiver is configured to support communication between the AMF entity and another network device, and may be, for example, a corresponding radio frequency module or baseband module. The AMF entity may further include a memory. The memory is configured to be coupled to the processor, and stores a program instruction and data that may be used by the AMF entity to perform the foregoing key obtaining method.

According to a seventh aspect, an embodiment of this application provides a computer storage medium, configured to store a computer software instruction used by the foregoing target AMF entity. The computer storage medium includes a program designed to perform the first aspect.

According to an eighth aspect, an embodiment of this application provides a computer program product, including an instruction. When the computer program product is executed by a computer, the instruction enables the computer to perform functions performed by the target AMF entity in the foregoing method.

According to a ninth aspect, to implement the foregoing key obtaining method provided in the second aspect, an embodiment of this application provides a key obtaining apparatus, and the apparatus has a function of implementing the foregoing key obtaining method. The function may be implemented by hardware, or may be implemented by hardware executing corresponding software. The hardware or software includes one or more modules corresponding to the foregoing function.

In a possible implementation of the ninth aspect, the apparatus includes a plurality of function modules or units, configured to implement any key obtaining method in the second aspect.

According to a tenth aspect, an embodiment of this application provides an AMF entity, and a structure of the AMF entity may include a processor and a transceiver. The processor is configured to support the AMF entity in performing corresponding functions in any key obtaining method in the second aspect. The transceiver is configured to support communication between the AMF entity and another network device, and may be, for example, a corresponding radio frequency module or baseband module. The AMF entity may further include a memory. The memory is configured to be coupled to the processor, and stores a program instruction and data that may be used by the AMF entity to perform the foregoing key obtaining method.

According to an eleventh aspect, an embodiment of this application provides a computer storage medium, configured to store a computer software instruction used by the foregoing target AMF entity. The computer storage medium includes a program designed to perform the second aspect.

According to a twelfth aspect, an embodiment of this application provides a computer program product, including an instruction. When the computer program is executed by a computer, the instruction enables the computer to perform functions performed by the target AMF entity in the foregoing method.

According to a thirteenth aspect, to implement the foregoing key obtaining method provided in the third aspect, an embodiment of this application provides a key obtaining apparatus, and the apparatus has a function of implementing the foregoing key obtaining method. The function may be implemented by hardware, or may be implemented by hardware executing corresponding software. The hardware or software includes one or more modules corresponding to the foregoing function.

In a possible implementation of the thirteenth aspect, the apparatus includes a plurality of function modules or units, configured to implement any key obtaining method in the third aspect.

According to a fourteenth aspect, an embodiment of this application provides a terminal device, and a structure of the terminal device may include a processor and a transceiver. The processor is configured to support the terminal device in performing corresponding functions in any key obtaining method in the third aspect. The transceiver is configured to support communication between the terminal device and another network device, and may be, for example, a corresponding radio frequency module or baseband module. The terminal device may further include a memory. The memory is configured to be coupled to the processor, and stores a program instruction and data that may be used by the terminal device to perform the foregoing key obtaining method.

According to a fifteenth aspect, an embodiment of this application provides a computer storage medium, configured to store a computer software instruction used by the foregoing terminal device. The computer storage medium includes a program designed to perform the third aspect.

According to a sixteenth aspect, an embodiment of this application provides a computer program product, including an instruction. When the computer program is executed by a computer, the instruction enables the computer to perform functions performed by the terminal device in the foregoing method.

According to a seventeenth aspect, to implement the foregoing key obtaining method provided in the fourth aspect, an embodiment of this application provides a key obtaining apparatus, and the apparatus has a function of implementing the foregoing key obtaining method. The function may be implemented by hardware, or may be implemented by hardware executing corresponding software. The hardware or software includes one or more modules corresponding to the foregoing function.

In a possible implementation of the seventeenth aspect, the apparatus includes a plurality of function modules or units, configured to implement any key obtaining method in the third aspect.

According to an eighteenth aspect, an embodiment of this application provides an authentication function entity, and a structure of the authentication function entity may include a processor and a transceiver. The processor is configured to support the authentication function entity in performing corresponding functions in any key obtaining method in the fourth aspect. The transceiver is configured to support communication between the authentication function entity and another network device, and may be, for example, a corresponding radio frequency module or baseband module. The authentication function entity may further include a memory. The memory is configured to be coupled to the processor, and stores a program instruction and data that may be used by the authentication function entity to perform the foregoing key obtaining method.

According to a nineteenth aspect, an embodiment of this application provides a computer storage medium, configured to store a computer software instruction used by the authentication function entity. The computer storage medium includes a program designed to perform the fourth aspect.

According to a twentieth aspect, an embodiment of this application provides a computer program product, including an instruction. When the computer program is executed by a computer, the instruction enables the computer to perform functions performed by the authentication function entity in the foregoing method.

According to a twenty-first aspect, an embodiment of this application provides a communications system, including a terminal device having the key obtaining apparatus provided in the thirteenth aspect, a target AMF entity having the key obtaining apparatus provided in the fifth aspect or the ninth aspect, an authentication function entity having the key obtaining apparatus provided in the seventeenth aspect, and a source AMF entity.

According to a twenty-second aspect, an embodiment of this application provides a communications system, including the terminal device provided in the fourteenth aspect, the target AMF entity provided in the sixth aspect or the tenth aspect, the authentication function entity provided in the eighteenth aspect, and a source AMF entity.

Compared with conventional techniques, in the methods, devices, and systems provided in the embodiments of this application, the target AMF entity determines, using the intermediate key sent by the source AMF entity, the communication key used between the target AMF entity and the terminal device, or the target AMF entity requests a new key from the authentication function entity to determine the communication key used between the target AMF entity and the terminal device, and instructs the terminal device to derive a corresponding key. In this way, key isolation is achieved between the target AMF entity and the source AMF entity, thereby effectively avoiding a security risk and improving network security.

DESCRIPTION OF EMBODIMENTS

The technical solutions provided in the embodiments of this application are applicable to a mobile network. The mobile network in the embodiments of this application is a combination of different mobile network element types, transmission networks, and network management subsystems. The different mobile network element types undertake different network functions, such as a base station, a controller, and a core network (CN). The transmission network is used to connect to a mobile network element, and the network management subsystem is used to manage a mobile network element and a transmission network.

A terminal device in the embodiments of this application may be a smartphone, a tablet computer, a pad, UE, or the like, or may be an Internet of Things terminal device such as a smart water meter. The mobile network and the terminal device are interconnected using a wireless interface, and a plurality of wireless technologies can be used by the wireless interface. In the embodiments of this application, the wireless technology that can be used by the wireless interface includes a 4th generation mobile communications technology (4G), or may be 5G that is currently being studied or even another mobile communications technology that is to be subsequently studied.

Figure 1:
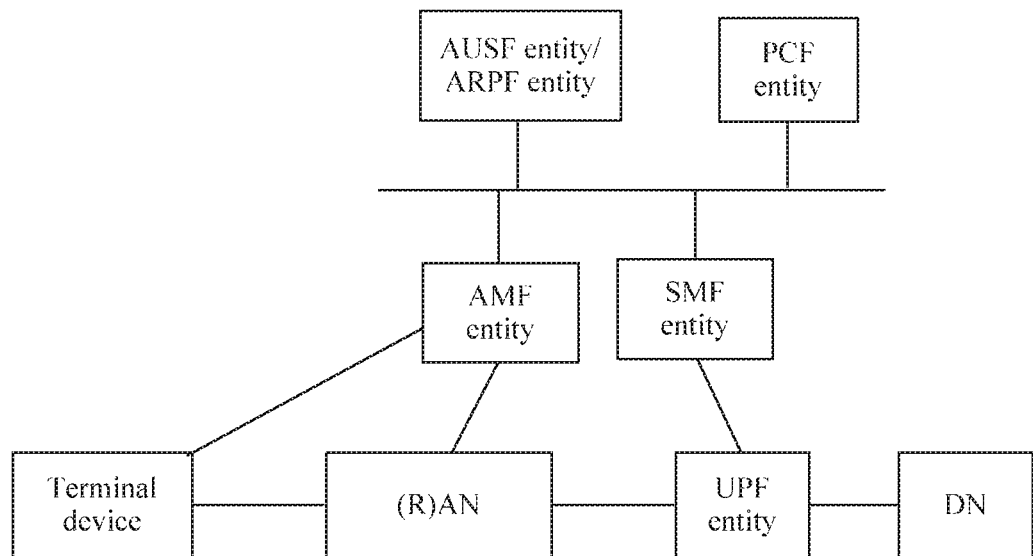
FIG. 1 is a schematic architectural diagram of an application scenario according to an embodiment of this application.

In the embodiments of this application, a 3rd Generation Partnership Project (3GPP) system shown in FIG. 1 is used as an example to describe an application scenario of this application. FIG. 1 is a schematic architectural diagram of an application scenario according to an embodiment of this application. As shown in FIG. 1, logical function units in the system architecture mainly include the following.

(1) (Radio) access network ((R)AN): The (R)AN provides network resources for access of a terminal device.

(2) AMF entity: The AMF entity is mainly responsible for a termination point of a radio access network control plane, a termination point of non access signaling, mobility management, lawful interception, access authorization/authentication, and the like.

(3) Session management function (SMF) entity: The SMF entity is mainly responsible for session management, Internet Protocol (IP) address assignment and management of a terminal device, manageable user plane function selection, a termination point of a policy control and charging function interface, downlink data notification, and the like.

(4) User plane function (UPF) entity: The UPF entity is mainly responsible for session and bearer management, Internet Protocol (IP) address assignment, and the like.

(5) Authentication server function (AUSF) entity: The AUSF entity is mainly responsible for user authentication, and the like. Authentication credential repository and processing function (ARPF) entity: The ARPF entity is mainly responsible for storing a long-term security trust status of a terminal device.

(6) Data Network (DN): The DN is a network for transmitting data, such as an Internet network.

(7) Policy control functionality: The function entity includes a policy control decision function, and is mainly responsible for providing a policy for a network.

It should be noted that, because a 5G structure is not determined, the architecture in the embodiments of this application is merely used as an example to describe the solutions provided in this application. For example, the system architecture may further include a security anchor function (SEAF) entity (mainly responsible for a function related to a network security anchor), and the SEAF entity may be an independent network element in the system architecture, or may be a network element that is integrated with an existing function entity. For example, the SEAF entity is integrated with an access and mobility management entity, or may be integrated with another network element. Therefore, the architecture in the foregoing application scenario is not intended to limit this application.

In the following embodiments of this application, a network element defined at a higher level is used, and is referred to as an authentication function entity to represent an entity that is used to authenticate a server function, for example, an AUSF, an ARPF, or a SEAF. The authentication function entity may be a network element deployed in a core network, or may be an application server outside a core network, or may be a function of an existing network element (for example, a function module inside an AUSF entity or an AMF entity), or may be another separated network element in the future.

A key obtaining method provided in the embodiments of this application may be applied to a 5G communications scenario, or may be applied to a 4G communications scenario. When the key obtaining method is used in the 4G scenario, a corresponding network element relationship is: an AMF and an SMF in 5G are replaced with an MME in 4G, a UPF in 5G is replaced with an S-GW and a P-GW in 4G, and an AUSF and an ARPF in 5G are replaced with a home subscriber server (HSS) in 4G.

The following describes in detail the technical solutions using embodiments of the application. The technical solutions of this application are mainly applied to a handover scenario in which a location of a terminal device in an idle state changes. In this scenario, a security context of the terminal device may be transferred from one entity to another entity, and a key between a target entity and the terminal device is the same as a key between a source entity and the terminal device. This may pose a security risk. For example, once a key is leaked, an operator cannot learn whether the key is leaked from the source entity or the target entity, and therefore responsibilities cannot be effectively divided; or if one of the source entity and the target entity is attacked, the other is also affected. Therefore, when the security context of the terminal device is transferred from one entity to another entity, how to perform key isolation becomes an urgent problem to be resolved.

In view of the above, the embodiments of this application provide a plurality of key obtaining methods and devices, and a plurality of communications systems, to improve network security. The following embodiments may be mutually combined, and same or similar concepts or processes may not be repeatedly described in some embodiments.

Figure 2A:
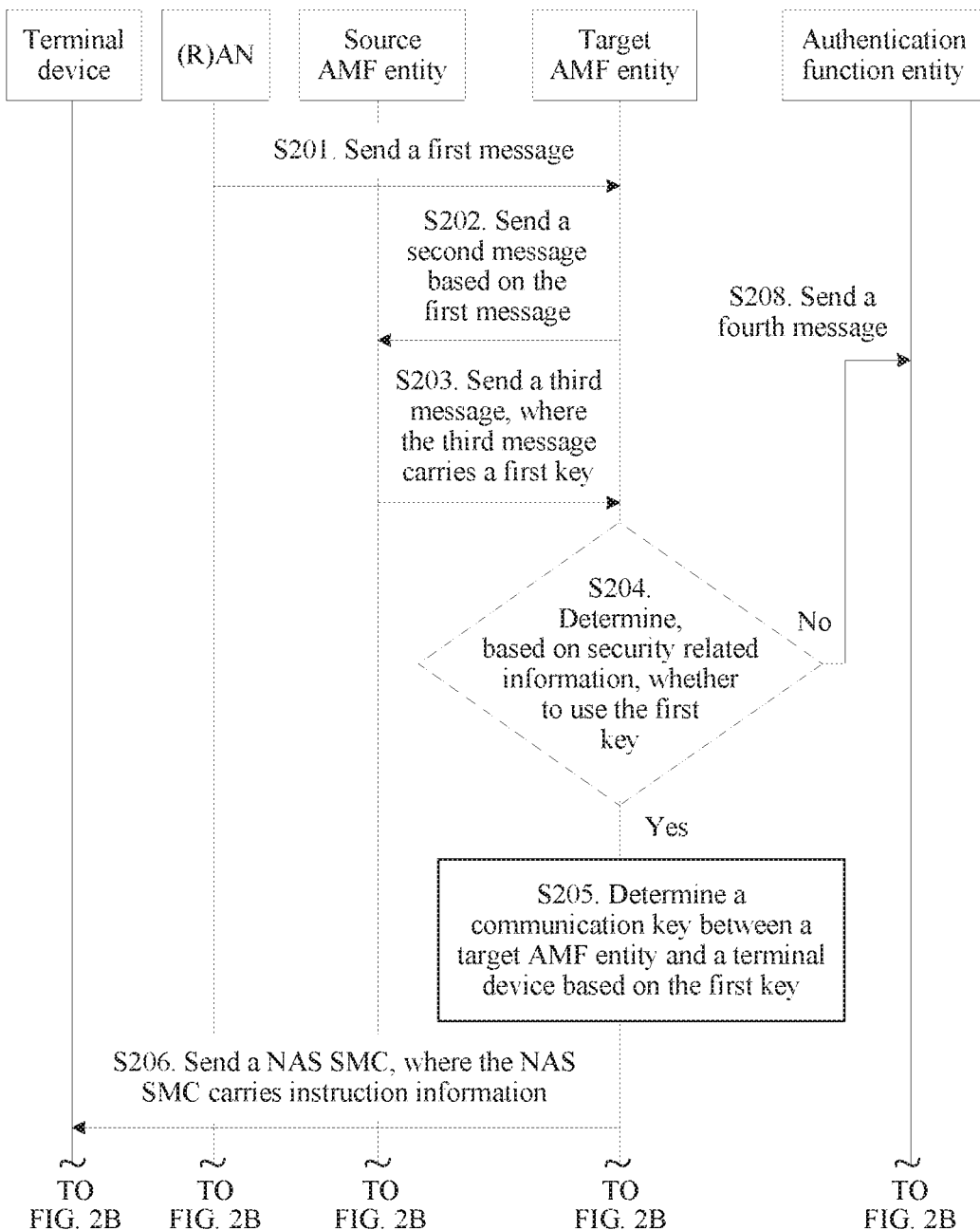
FIG. 2A and FIG. 2B are schematic flowcharts of a key obtaining method according to an embodiment of this application.
Figure 2B:
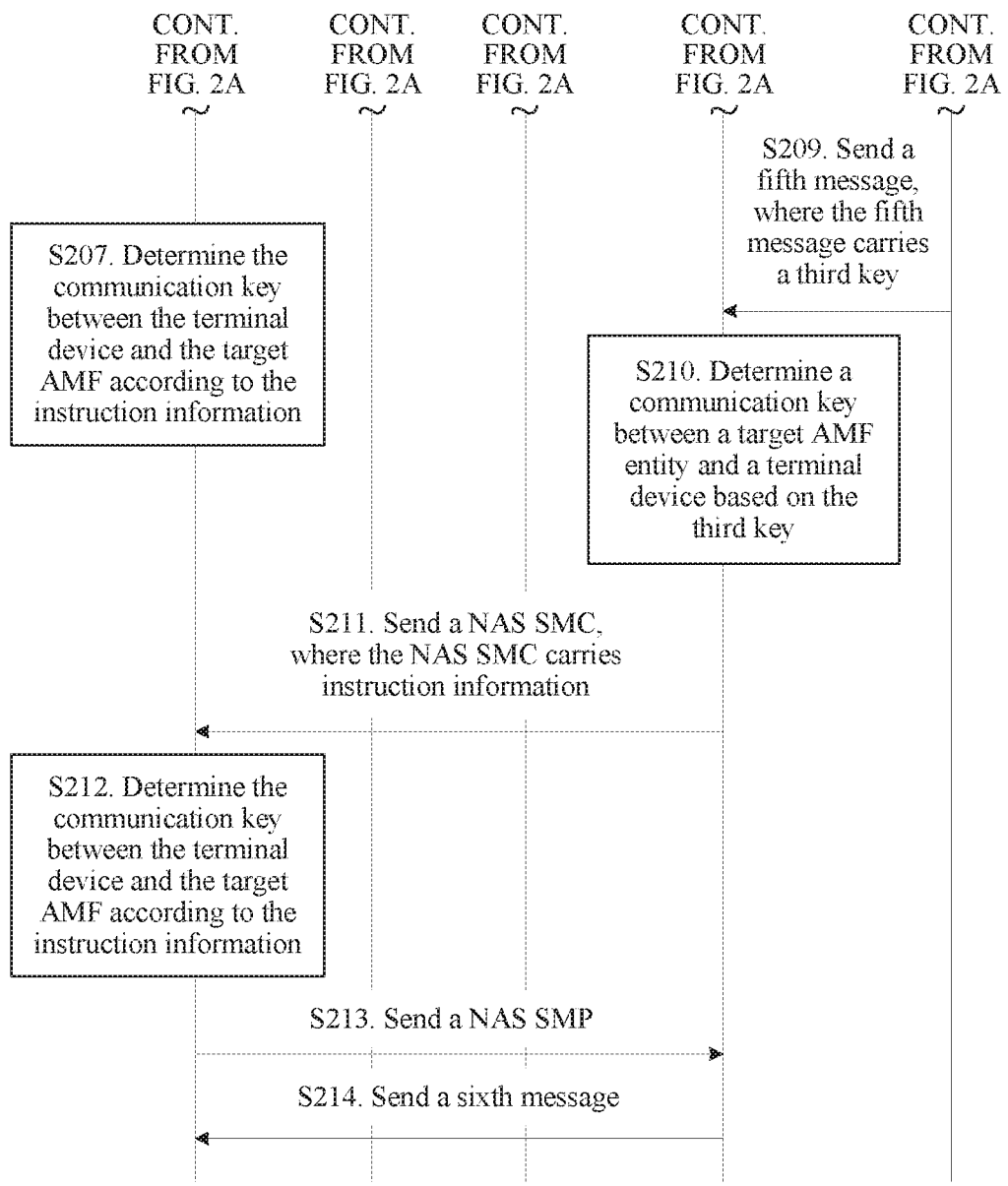

FIG. 2A and FIG. 2B are schematic flowcharts of a key obtaining method according to an embodiment of this application. Details are as follows.

S201. A target AMF entity receives a first message.

The first message may be used to request to register a terminal device, and the first message may be a registration request message.

In an example, when a location of the terminal device in an idle state changes, the terminal device sends a registration request to a (R)AN, and the (R)AN selects a target AMF entity for the terminal device according to the registration request of the terminal device, and sends the registration request of the terminal device to the target AMF entity.

In another example, a (R)AN detects that a location of the terminal device changes, selects a target AMF entity for the terminal device based on a current location of the terminal device, and sends a registration request to the target AMF entity.

In still another example, a (R)AN detects that a location of the terminal device changes, selects a target AMF entity for the terminal device based on a current location of the terminal device, and notifies the terminal device of the selected target AMF entity, and the terminal device sends a registration request to the target AMF entity.

In the accompanying drawing (FIG. 2A and FIG. 2B) corresponding to this embodiment, an example in which the (R)AN sends the first message to the target AMF entity is used for description.

S202. The target AMF entity sends a second message to a source AMF entity based on the first message.

The second message may be used to request a security context of the terminal device, and may be, for example, an information request message.

In addition, the second message may include an identifier of the terminal device, for example, a user permanent identity or a temporary identity such as an international mobile subscriber identity (IMSI) or a globally unique temporary UE identity (GUTI), such that the source AMF entity sends the security context corresponding to the identifier of the terminal device to the target AMF entity.

S203. The target AMF entity receives a third message from the source AMF entity, where the third message carries a first key.

The third message may be used to respond to the second message, and the third message may be used to send the security context of the terminal device to the target AMF entity. For example, the third message is an information response message.

The first key (referred to as $K_{oAMF}'$ below) carried in the third message may be obtained by the source AMF entity through derivation based on a key (referred to as a second key below and marked as $K_{oAMF}$) between the source AMF entity and the terminal device.

Further, the first key may be obtained by the source AMF entity through derivation based on the key between the source AMF entity and the terminal device and a random number of the terminal device, or may be obtained by the source AMF entity through derivation based on the key between the source AMF entity and the terminal device and a random number of the source AMF entity.

The key between the source AMF entity and the terminal device includes a communication key between the source AMF entity and the terminal device or a key shared between the source AMF entity and the terminal device. In some embodiments, the key shared between the source AMF entity and the terminal device may be an MSK, or a key generated based on an MSK, or a key generated based on a CK and an IK. The IK and the CK may be derived by an AUSF or an ARPF based on a permanent key K.

It should be noted that the communication key between the source AMF entity and the terminal device is a key used for communication between the source AMF entity and the terminal device. For example, the terminal device uses the communication key to perform encryption protection processing or integrity protection processing on data or signaling that is to be sent by the terminal device to the source AMF entity, and then sends processed data or signaling to the source AMF entity. Meanings of communication keys in this specification are similar, and details are not described.

In an example, the source AMF entity may derive $K_{oAMF}'$ using a key derivation function (KDF) based on $K_{oAMF}$. In this way, backward security of a key can be implemented, to be specific, the target AMF entity cannot derive a key used by the source AMF entity. For example, if the source AMF entity cannot determine whether the target AMF entity is secure, the source AMF may use this manner instead of directly sending a key used between the source AMF entity and the terminal device to the target AMF entity.

In another example, the first key may be obtained by the source AMF entity through derivation based on the key between the source AMF entity and the terminal device and the random number of the terminal device. In other words, the source AMF entity may derive $K_{oAMF}'$ using a KDF based on $K_{oAMF}$ and the random number of the terminal device.

The random number of the terminal device is carried in the registration request message sent by the terminal device to the (R)AN, and then the (R)AN sends, to the target AMF entity, the first message that carries the random number of the terminal device; or the random number of the terminal device is carried when the terminal device sends the registration request message of the terminal device to the target AMF entity. Then the target AMF entity sends, to the source AMF entity, the second message that carries the random number of the terminal device, and the source AMF entity uses the random number of the terminal device as an input parameter when deriving the first key ($K_{oAMF}'$).

In still another example, the first key is obtained by the source AMF entity through derivation based on the key between the source AMF entity and the terminal device and the random number of the source AMF entity. In some embodiments, the source AMF entity may derive the first key ($K_{oAMF}'$) using a KDF based on $K_{oAMF}$ and the random number of the source AMF entity. Because a capability of generating a random number by the terminal device may be poorer than that of a network side, that is, randomness is not sufficiently strong, the source AMF entity uses the random number of the source AMF entity as an input parameter when deriving the first key ($K_{oAMF}'$), to enhance a key isolation effect.

In this case, the third message that is sent by the source AMF entity and that is received by the target AMF entity in S203 may further carry the random number of the source AMF entity.

S204. The target AMF entity determines, based on security related information, whether to use the first key.

If the first key is to be used, S205 to S207 are performed; if the first key is not to be used, S208 to S212 are performed.

The security related information may include at least one of a preconfigured policy, key isolation information of the target AMF entity, or a security status of the source AMF entity.

The preconfigured policy is used to indicate to use a key received from the source AMF entity, or the policy is used to indicate to use a key received from an authentication function entity.

The key isolation information is used to indicate whether a key of the target AMF entity is totally isolated from a key of the source AMF entity. For example, when the target AMF entity can derive the key between the source AMF entity and the terminal device using a key provided by the source AMF entity, the key of the target AMF entity is not totally isolated from the key of the source AMF entity. When the target AMF entity cannot derive the key between the source AMF entity and the terminal device based on a key provided by the source AMF entity, and the source AMF entity cannot derive a communication key between the target AMF entity and the terminal device either, the key of the target AMF entity is totally isolated from the key of the source AMF entity.

The security status of the source AMF entity is used to indicate whether the source AMF entity is secure. Whether the source AMF entity is secure may be whether a location of the source AMF entity is secure, whether the source AMF entity and the target AMF entity are in a same network domain, whether the source AMF entity is trusted, or the like. For example, if the location of the source AMF entity is secure, the source AMF entity is secure, and if the location of the source AMF entity is not secure, the source AMF entity is not secure; or if the source AMF entity and the target AMF entity are in a same network domain, the source AMF entity is secure, and if the source AMF entity and the target AMF entity are not in a same network domain, the source AMF entity is not secure; or if the source AMF entity is trusted, the source AMF entity is secure, and if the source AMF entity is not trusted, the source AMF entity is not secure.

For example, step S204 may be implemented in one or more of the following manners.

When the security related information is the preconfigured policy and the policy is used to indicate to use the key received from the source AMF entity, the target AMF entity determines to use the key received from the source AMF entity.

When the security related information is the key isolation information of the target AMF entity and the key isolation information of the target AMF entity is used to indicate that the key of the target AMF entity is not totally isolated from the key of the source AMF entity, the target AMF entity determines to use the key received from the source AMF entity.

When the security related information is the security status of the source AMF entity and the security status is used to indicate that the source AMF entity is secure, the target AMF entity determines to use the key received from the source AMF entity.

For example, step S204 may alternatively be implemented in one or more of the following manners.

When the security related information is the preconfigured policy and the policy is used to indicate to use the key received from the authentication function entity, the target AMF entity determines not to use the key received from the source AMF entity.

When the security related information is the key isolation information of the target AMF entity and the key isolation information of the target AMF entity is used to indicate that the key of the target AMF entity is totally isolated from the key of the source AMF entity, the target AMF entity determines not to use the key received from the source AMF entity.

When the security related information is the security status of the source AMF entity and the security status is used to indicate that the source AMF entity is not secure, the target AMF entity determines not to use the key received from the source AMF entity.

Obviously, content included in the security related information may be used together. For example, when the security related information includes the preconfigured policy and the security status of the source AMF entity, whether to use the first key is determined based on the security status of the source AMF entity. For another example, when the security related information includes the key isolation information of the target AMF entity and the security status of the source AMF entity, if the key isolation information of the target AMF entity indicates that the key of the target AMF entity is totally isolated from the key of the source AMF entity, and the security status of the source AMF entity indicates that the source AMF entity is secure, it is determined not to use the first key. Details are not described.

S205. The target AMF entity determines a communication key between the target AMF entity and a terminal device based on the first key.

S206. The target AMF entity sends a NAS SMC to the terminal device, where the NAS SMC carries indication information.

The indication information is used to indicate the terminal device to derive the communication key between the terminal device and the target AMF entity based on the key between the source AMF entity and the terminal device, for example, instruct the terminal device to derive the communication key between the terminal device and the target AMF entity based on the second key ($K_{oAMF}$).

In an example, because the key between the source AMF entity and the terminal device includes the communication key between the source AMF entity and the terminal device or the key shared between the source AMF entity and the terminal device, when the first key ($K_{oAMF}'$) is derived based on the communication key between the source AMF entity and the terminal device, the indication information may be used to indicate the terminal device to derive the first key ($K_{oAMF}'$) based on the communication key between the source AMF entity and the terminal device, or used to indicate to derive the communication key between the source AMF entity and the terminal device based on the key shared between the source AMF entity and the terminal device and then derive the first key ($K_{oAMF}'$) based on the communication key between the source AMF entity and the terminal device; or when the first key ($K_{oAMF}'$) is derived based on the key shared between the source AMF entity and the terminal device, the indication information is used to indicate the terminal device to derive the first key ($K_{oAMF}'$) based on the key shared between the source AMF entity and the terminal device.

S207. The terminal device determines the communication key between the terminal device and the target AMF entity according to the indication information.

S208. The target AMF entity sends a fourth message to an authentication function entity.

The fourth message may be used for a key request, and may be, for example, a key request message, and the fourth message may carry the identifier of the terminal device, such that the authentication function entity obtains, based on the identifier of the terminal device, a key shared between the authentication function entity and the terminal device (which may be referred to as a fourth key and marked as $K_{AUF}$).

The key shared between the authentication function entity and the terminal device is an EMSK, or a key generated based on an EMSK, or a key generated based on a CK and an IK.

For example, after performing subscription authentication on the terminal device, the authentication function entity may generate two keys (it is assumed that the two keys are a key A and a key B), and the key A is retained in the authentication function entity. In this case, the key A may be used as $K_{AUF}$, and the key B is sent to another network element (for example, an AMF/MME).

In a possible case, the Extensible Authentication Protocol (EAP) is used in an authentication process. Because two keys: an EMSK and an MSK are generated after EAP authentication is completed, the EMSK may be considered as the key A, the MSK is considered as the key B, and the EMSK is shared (not sent) between the authentication function entity and the terminal device, and the MSK is sent to another network element such as the source AMF. In this case, $K_{AUF}$ may be the EMSK, and then the MSK may be considered as $K_{oAMF}$. If the target AMF entity does not use an intermediate key derived using $K_{oAMF}$, the target AMF entity requests a key from the authentication function entity. In other words, a new key is derived using $K_{AUF}$ shared between the terminal device and the authentication function entity, and the source AMF does not know the derived new key.

In another possible case, if the Evolved Packet System (EPS) protocol is used in an authentication process, $K_{AUF}$ may be a key generated using a CK and an IK. Both the CK and the IK are generated using a permanent key K. For example, in LTE, the CK and the IK may be generated using the permanent key K, and then $K_{ASME}$ is generated using the CK and the IK. In this embodiment, two keys $K_{ASME}$ may be generated using the CK and the IK. One similar to $K_{ASME}$ in 4G is delivered to an MME, and the other is stored in the authentication function entity as $K_{AUF}$.

For example, the third message may carry an address of the authentication function entity, and the target AMF entity may send the fourth message to the authentication function entity based on the address of the authentication function entity, or the target AMF entity may select the authentication function entity based on the identifier of the terminal device, and then send the fourth message to the authentication function entity.

S209. The target AMF entity receives a fifth message sent by the authentication function entity, where the fifth message carries a third key.

The fifth message may be used to respond to the fourth message, and may be, for example, a key response message.

The third key (referred to as $K_{AUF}'$ below) may be obtained by the authentication function entity through derivation based on the key ($K_{AUF}$) shared between the authentication function entity and the terminal device.

In a first optional implementation, the authentication function entity may derive the third key ($K_{AUF}'$) using a KDF based on the fourth key ($K_{AUF}$).

In a second optional implementation, the third key is obtained by the authentication function entity through derivation based on the key shared between the authentication function entity and the terminal device and the random number of the terminal device. For example, the authentication function entity may derive the third key ($K_{AUF}'$) using the KDF based on the fourth key ($K_{AUF}$) and the random number of the terminal device.

The random number of the terminal device may be carried when the terminal device sends the registration request message to the (R)AN, and then the (R)AN sends, to the target AMF entity, the first message that carries the random number of the terminal device; or the random number of the terminal device may be carried when the terminal device sends the registration request message of the terminal device to the target AMF entity. Then the target AMF entity sends, to the authentication function entity, the fourth message that carries the random number of the terminal device, and the authentication function entity uses the random number of the terminal device as an input parameter when deriving the third key ($K_{AUF}'$).

In a third optional implementation, the third key is obtained by the authentication function entity through derivation based on the key shared between the authentication function entity and the terminal device and a random number of the authentication function entity. In some aspects, the authentication function entity may derive the third key ($K_{AUF}'$) using a KDF based on the fourth key ($K_{AUF}$) and the random number of the authentication function entity. Because a capability of generating a random number by the terminal device may be poorer than that of a network side, that is, randomness is not sufficiently strong, the authentication function entity uses the random number of the authentication function entity as an input parameter when deriving the third key ($K_{AUF}'$).

S210. The target AMF entity determines a communication key between the target AMF entity and a terminal device based on the third key.

S211. The target AMF entity sends a NAS SMC to the terminal device.

The NAS SMC carries indication information, and the indication information is used to indicate the terminal device to derive the communication key between the terminal device and the target AMF entity based on the key ($K_{AUF}$) shared between the authentication function entity and the terminal device.

Optionally, the NAS SMC further includes a key set identifier, and the key set identifier is similar to KSI_ASME in LTE, and is used to indicate a root key to be used by the terminal device for derivation. The key set identifier may have a same format as KSI_AMSE.

S212. The terminal device determines the communication key between the terminal device and the target AMF entity according to indication information.

Optionally, the method may further include the following steps.

S213. The terminal device sends a NAS security mode complete (SMP) message to the target AMF entity.

S214. The target AMF entity sends a sixth message to the terminal device.

The sixth message may be used to notify the terminal device that registration of the terminal device is accepted, and may be, for example, a registration accept message.

In the key obtaining method provided in this embodiment, the target AMF entity dynamically determines whether to use an intermediate key sent by the source AMF entity to determine the communication key used between the target AMF entity and the terminal device, or request a new key from the authentication function entity to determine the communication key used between the target AMF entity and the terminal device, and instructs the terminal device to derive a corresponding key. In this way, key isolation is achieved between the target AMF entity and the source AMF entity, thereby effectively avoiding a security risk and improving network security.

Optionally, in a first implementation scenario of the foregoing embodiment, S205 to S207 may be implemented in the following manners.

Manner 1: In an implementation process of S205, the target AMF entity uses the first key ($K_{oAMF}'$) as the communication key between the target AMF entity and the terminal device.

Case 1: The first key ($K_{oAMF}'$) is derived by the source AMF entity based on the key ($K_{oAMF}$) between the terminal device and the source AMF entity.

Correspondingly, in S207, the terminal device derives the first key ($K_{oAMF}'$) based on the key ($K_{oAMF}$) between the terminal device and the source AMF entity, and uses the first key ($K_{oAMF}'$) as the communication key between the terminal device and the target AMF entity.

Case 2: The first key ($K_{oAMF}'$) is derived by the source AMF entity based on the key ($K_{oAMF}$) between the terminal device and the source AMF entity and the random number of the terminal device.

Correspondingly, in S207, the terminal device derives the first key ($K_{oAMF}'$) based on the key ($K_{oAMF}$) between the terminal device and the source AMF entity and the random number of the terminal device, and uses the first key ($K_{oAMF}'$) as the communication key between the terminal device and the target AMF entity.

In this case, in S206, the NAS SMC sent by the target AMF entity to the terminal device may further carry the random number of the terminal device.

It may be understood that, in this case, the random number of the terminal device may be further used by the terminal device to detect replay, to prevent a replay attack.

Case 3: The first key ($K_{oAMF}'$) is derived by the source AMF entity based on the key ($K_{oAMF}$) between the terminal device and the source AMF entity and the random number of the source AMF entity.

Correspondingly, in S207, the terminal device derives the first key ($K_{oAMF}'$) based on the key ($K_{oAMF}$) between the terminal device and the source AMF entity and the random number of the source AMF entity, and uses the first key ($K_{oAMF}'$) as the communication key between the terminal device and the target AMF entity.

In this case, in S206, the NAS SMC sent by the target AMF entity to the terminal device may further carry the random number of the source AMF entity.

It should be noted that, in case 3, in S206, the NAS SMC sent by the target AMF entity to the terminal device may further carry the random number of the terminal device. In this case, the random number of the terminal device is used only by the terminal device to detect replay, to prevent a replay attack.

Manner 2: In an implementation process of S205, the target AMF entity derives the communication key between the target AMF entity and the terminal device based on the first key ($K_{oAMF}'$) and the random number of the terminal device. Further, in S206, the NAS SMC sent by the target AMF entity to the terminal device further carries the random number of the terminal device.

Case 1: The first key ($K_{oAMF}'$) is derived by the source AMF entity based on the key ($K_{oAMF}$) between the terminal device and the source AMF entity.

Correspondingly, in S207, the terminal device derives the first key ($K_{oAMF}'$) based on the key ($K_{oAMF}$) between the terminal device and the source AMF entity, and derives the communication key between the terminal device and the target AMF entity based on the first key ($K_{oAMF}'$) and the random number of the terminal device.

Case 2: The first key ($K_{oAMF}'$) is derived by the source AMF entity based on the key ($K_{oAMF}$) between the terminal device and the source AMF entity and the random number of the terminal device.

Correspondingly, in S207, the terminal device derives the first key ($K_{oAMF}'$) based on the key ($K_{oAMF}$) between the terminal device and the source AMF entity and the random number of the terminal device, and derives the communication key between the terminal device and the target AMF entity based on the first key ($K_{oAMF}'$) and the random number of the terminal device. It may be understood that, in this case, the random number of the terminal device may be further used by the terminal device to detect replay, to prevent a replay attack.

Case 3: The first key ($K_{oAMF}'$) is derived by the source AMF entity based on the key ($K_{oAMF}$) between the terminal device and the source AMF entity and the random number of the source AMF entity.

Correspondingly, in S207, the terminal device derives the first key ($K_{oAMF}'$) based on the key ($K_{oAMF}$) between the terminal device and the source AMF entity and the random number of the source AMF entity, and derives the communication key between the terminal device and the target AMF entity based on the first key ($K_{oAMF}'$) and the random number of the terminal device. It may be understood that, in this case, the random number of the terminal device may be further used by the terminal device to detect replay, to prevent a replay attack.

Manner 3: In an implementation process of S205, the target AMF entity derives the communication key between the target AMF entity and the terminal device based on the first key ($K_{oAMF}'$) and a random number of the target AMF entity. Further, in S206, the NAS SMC sent by the target AMF entity to the terminal device further carries the random number of the target AMF entity.

Case 1: The first key ($K_{oAMF}'$) is derived by the source AMF entity based on the key ($K_{oAMF}$) between the terminal device and the source AMF entity.

Correspondingly, in S207, the terminal device derives the first key ($K_{oAMF}'$) based on the key ($K_{oAMF}$) between the terminal device and the source AMF entity, and derives the communication key between the terminal device and the target AMF entity based on the first key ($K_{oAMF}'$) and the random number of the target AMF entity.

Case 2: The first key ($K_{oAMF}'$) is derived by the source AMF entity based on the key ($K_{oAMF}$) between the terminal device and the source AMF entity and the random number of the terminal device.

Correspondingly, in S207, the terminal device derives the first key ($K_{oAMF}'$) based on the key ($K_{oAMF}$) between the terminal device and the source AMF entity and the random number of the terminal device, and derives the communication key between the terminal device and the target AMF entity based on the first key ($K_{oAMF}'$) and the random number of the target AMF entity. It may be understood that, in this case, the random number of the terminal device may be further used by the terminal device to detect replay, to prevent a replay attack.

Further, in S206, the NAS SMC sent by the target AMF entity to the terminal device may further carry the random number of the terminal device.

Case 3: The first key ($K_{oAMF}'$) is derived by the source AMF entity based on the key ($K_{oAMF}$) between the terminal device and the source AMF entity and the random number of the source AMF entity.

Correspondingly, in S207, the terminal device derives the first key ($K_{oAMF}'$) based on the key ($K_{oAMF}$) between the terminal device and the source AMF entity and the random number of the source AMF entity, and derives the communication key between the terminal device and the target AMF entity based on the first key ($K_{oAMF}'$) and the random number of the target AMF entity.

It should be noted that, in case 3, in S206, the NAS SMC sent by the target AMF entity to the terminal device may further carry the random number of the terminal device. In this case, the random number of the terminal device is used only by the terminal device to detect replay, to prevent a replay attack.

Manner 4: In an implementation process of S205, the target AMF entity derives a key (which may be referred to as a sixth key and marked as $K_{DH}$) using a key exchange algorithm based on a random number of the target AMF entity and the random number of the terminal device, and derives the communication key between the target AMF entity and the terminal device based on the first key ($K_{oAMF}'$) and the sixth key ($K_{DH}$).

Further, in S206, the NAS SMC sent by the target AMF entity to the terminal device further carries the random number of the target AMF entity and the random number of the terminal device.

Case 1: The first key ($K_{oAMF}'$) is derived by the source AMF entity based on the key ($K_{oAMF}$) between the terminal device and the source AMF entity.

Correspondingly, in S207, the terminal device derives the first key ($K_{oAMF}'$) based on the key ($K_{oAMF}$) between the terminal device and the source AMF entity, derives the sixth key ($K_{DH}$) using the key exchange algorithm based on the random number of the target AMF entity and the random number of the terminal device, and derives the communication key between the terminal device and the target AMF entity based on the first key ($K_{oAMF}'$) and the sixth key ($K_{DH}$). Similarly, in this case, the random number of the terminal device may be further used by the terminal device to detect replay, to prevent a replay attack.

Case 2: The first key ($K_{oAMF}'$) is derived by the source AMF entity based on the key ($K_{oAMF}$) between the terminal device and the source AMF entity and the random number of the terminal device.

Correspondingly, in S207, the terminal device derives the first key ($K_{oAMF}'$) based on the key ($K_{oAMF}$) between the terminal device and the source AMF entity and the random number of the terminal device, derives the sixth key ($K_{DH}$) using the key exchange algorithm based on the random number of the target AMF entity and the random number of the terminal device, and derives the communication key between the terminal device and the target AMF entity based on the first key ($K_{oAMF}'$) and the sixth key ($K_{DH}$). Similarly, in this case, the random number of the terminal device may be further used by the terminal device to detect replay, to prevent a replay attack.

Case 3: The first key ($K_{oAMF}'$) is derived by the source AMF entity based on the key ($K_{oAMF}$) between the terminal device and the source AMF entity and the random number of the source AMF entity.

Correspondingly, in S207, the terminal device derives the first key ($K_{oAMF}'$) based on the key ($K_{oAMF}$) between the terminal device and the source AMF entity and the random number of the source AMF entity, derives the sixth key ($K_{DH}$) using the key exchange algorithm based on the random number of the target AMF entity and the random number of the terminal device, and derives the communication key between the terminal device and the target AMF entity based on the first key ($K_{oAMF}'$) and the sixth key ($K_{DH}$). Similarly, in this case, the random number of the terminal device may be further used by the terminal device to detect replay, to prevent a replay attack.

Manner 5: In an implementation process of S205, the target AMF entity derives a fifth key (referred to as $K_{nAMF}'$ below) based on the first key ($K_{oAMF}'$) and the random number of the target AMF entity, derives a sixth key ($K_{DH}$) using a key exchange algorithm based on a random number of the target AMF entity and the random number of the terminal device, and derives the communication key between the target AMF entity and the terminal device based on the fifth key ($K_{nAMF}'$) and the sixth key ($K_{DH}$).

Further, in S206, the NAS SMC sent by the target AMF entity to the terminal device further carries the random number of the target AMF entity and the random number of the terminal device.

Case 1: The first key ($K_{oAMF}'$) is derived by the source AMF entity based on the key ($K_{oAMF}$) between the terminal device and the source AMF entity.

Correspondingly, in S207, the terminal device derives the first key ($K_{oAMF}'$) based on the key ($K_{oAMF}$) between the terminal device and the source AMF entity, derives the fifth key ($K_{nAMF}'$) based on the first key ($K_{oAMF}'$) and the random number of the target AMF entity, derives the sixth key ($K_{DH}$) using the key exchange algorithm based on the random number of the target AMF entity and the random number of the terminal device, and derives the communication key between the terminal device and the target AMF entity based on the fifth key ($K_{nAMF}'$) and the sixth key ($K_{DH}$). Similarly, in this case, the random number of the terminal device may be further used by the terminal device to detect replay, to prevent a replay attack.

Case 2: The first key ($K_{oAMF}'$) is derived by the source AMF entity based on the key ($K_{oAMF}$) between the terminal device and the source AMF entity and the random number of the terminal device.

Correspondingly, in S207, the terminal device derives the first key ($K_{oAMF}'$) based on the key ($K_{oAMF}$) between the terminal device and the source AMF entity and the random number of the terminal device, derives the fifth key ($K_{nAMF}'$) based on the first key ($K_{oAMF}'$) and the random number of the target AMF entity, derives the sixth key ($K_{DH}$) using the key exchange algorithm based on the random number of the target AMF entity and the random number of the terminal device, and derives the communication key between the terminal device and the target AMF entity based on the fifth key ($K_{nAMF}'$) and the sixth key ($K_{DH}$). Similarly, in this case, the random number of the terminal device may be further used by the terminal device to detect replay, to prevent a replay attack.

Case 3: The first key ($K_{oAMF}'$) is derived by the source AMF entity based on the key ($K_{oAMF}$) between the terminal device and the source AMF entity and the random number of the source AMF entity.

Correspondingly, in S207, the terminal device derives the first key ($K_{oAMF}'$) based on the key ($K_{oAMF}$) between the terminal device and the source AMF entity and the random number of the source AMF entity, derives the fifth key ($K_{nAMF}'$) based on the first key ($K_{oAMF}'$) and the random number of the target AMF entity, derives the sixth key ($K_{DH}$) using the key exchange algorithm based on the random number of the target AMF entity and the random number of the terminal device, and derives the communication key between the terminal device and the target AMF entity based on the fifth key ($K_{nAMF}'$) and the sixth key ($K_{DH}$). Similarly, in this case, the random number of the terminal device may be further used by the terminal device to detect replay, to prevent a replay attack.

For example, the key exchange algorithm may be a Diffie-Hellman (DH) key exchange algorithm, which may be referred to as a DH key exchange algorithm for short. An implementation principle of the DH key exchange algorithm is consistent with that in a related technology, and details are not described herein.

Optionally, in a second implementation scenario of the foregoing embodiment, S210 to S212 may be implemented in the following manners.

Manner 1: In an implementation process of S210, the target AMF entity uses the third key ($K_{AUF}'$) as the communication key between the target AMF entity and the terminal device.

Case 1: The third key ($K_{AUF}'$) is derived by the authentication function entity based on the key ($K_{AUF}$) between the terminal device and the authentication function entity.

Correspondingly, in S212, the terminal device derives the third key ($K_{AUF}'$) based on the key ($K_{AUF}$) between the terminal device and the authentication function entity, and uses the third key ($K_{AUF}'$) as the communication key between the terminal device and the target AMF entity.

Case 2: The third key ($K_{AUF}'$) is derived by the authentication function entity based on the key ($K_{AUF}$) between the terminal device and the authentication function entity and the random number of the terminal device.

Correspondingly, in S212, the terminal device derives the third key ($K_{AUF}'$) based on the key ($K_{AUF}$) between the terminal device and the authentication function entity and the random number of the terminal device, and uses the third key ($K_{AUF}'$) as the communication key between the terminal device and the target AMF entity.

In this case, in S211, the NAS SMC sent by the target AMF entity to the terminal device may further carry the random number of the terminal device.

It may be understood that, in this case, the random number of the terminal device may be further used by the terminal device to detect replay, to prevent a replay attack.

Case 3: The third key ($K_{AUF}'$) is derived by the authentication function entity based on the key ($K_{AUF}$) between the terminal device and the authentication function entity and the random number of the authentication function entity.

Correspondingly, in S212, the terminal device derives the third key ($K_{AUF}'$) based on the key ($K_{AUF}$) between the terminal device and the authentication function entity and the random number of the authentication function entity, and uses the third key ($K_{AUF}'$) as the communication key between the terminal device and the target AMF entity.

In this case, in S211, the NAS SMC sent by the target AMF entity to the terminal device may further carry the random number of the authentication function entity.

It should be noted that, in case 3, in S211, the NAS SMC sent by the target AMF entity to the terminal device may further carry the random number of the terminal device. In this case, the random number of the terminal device is used only by the terminal device to detect replay, to prevent a replay attack.

Manner 2: In an implementation process of S210, the target AMF entity derives the communication key between the target AMF entity and the terminal device based on the third key ($K_{AUF}'$) and the random number of the terminal device. Further, in S211, the NAS SMC sent by the target AMF entity to the terminal device further carries the random number of the terminal device.

Case 1: The third key ($K_{AUF}'$) is derived by the authentication function entity based on the key ($K_{AUF}$) between the terminal device and the authentication function entity.

Correspondingly, in S212, the terminal device derives the third key ($K_{AUF}'$) based on the key ($K_{AUF}$) between the terminal device and the authentication function entity, and derives the communication key between the terminal device and the target AMF entity based on the third key ($K_{AUF}'$) and the random number of the terminal device.

Case 2: The third key ($K_{AUF}'$) is derived by the authentication function entity based on the key ($K_{AUF}$) between the terminal device and the authentication function entity and the random number of the terminal device.

Correspondingly, in S212, the terminal device derives the third key ($K_{AUF}'$) based on the key ($K_{AUF}$) between the terminal device and the authentication function entity and the random number of the terminal device, and derives the communication key between the terminal device and the target AMF entity based on the third key ($K_{AUF}'$) and random number of the terminal device. It may be understood that, in this case, the random number of the terminal device may be further used by the terminal device to detect replay, to prevent a replay attack.

Case 3: The third key ($K_{AUF}'$) is derived by the authentication function entity based on the key ($K_{AUF}$) between the terminal device and the authentication function entity and the random number of the authentication function entity.

Correspondingly, in S212, the terminal device derives the third key ($K_{AUF}'$) based on the key ($K_{AUF}$) between the terminal device and the authentication function entity and the random number of the authentication function entity, and derives the communication key between the terminal device and the target AMF entity based on the third key ($K_{AUF}'$) and the random number of the terminal device. In this case, the random number of the terminal device may be further used by the terminal device to detect replay, to prevent a replay attack.

Manner 3: In an implementation process of S210, the target AMF entity derives the communication key between the target AMF entity and the terminal device based on the third key ($K_{AUF}'$) and a random number of the target AMF entity. Further, in S211, the NAS SMC sent by the target AMF entity to the terminal device further carries the random number of the target AMF entity.

Case 1: The third key ($K_{AUF}'$) is derived by the authentication function entity based on the key ($K_{AUF}$) between the terminal device and the authentication function entity.

Correspondingly, in S212, the terminal device derives the third key ($K_{AUF}'$) based on the key ($K_{AUF}$) between the terminal device and the authentication function entity, and derives the communication key between the terminal device and the target AMF entity based on the third key ($K_{AUF}'$) and the random number of the target AMF entity.

Case 2: The third key ($K_{AUF}'$) is derived by the authentication function entity based on the key ($K_{AUF}$) between the terminal device and the authentication function entity and the random number of the terminal device.

Correspondingly, in S212, the terminal device derives the third key ($K_{AUF}'$) based on the key ($K_{AUF}$) between the terminal device and the authentication function entity and the random number of the terminal device, and derives the communication key between the terminal device and the target AMF entity based on the third key ($K_{AUF}'$) and the random number of the target AMF entity. It may be understood that, in this case, the random number of the terminal device may be further used by the terminal device to detect replay, to prevent a replay attack.

Further, in S211, the NAS SMC sent by the target AMF entity to the terminal device may further carry the random number of the terminal device.

Case 3: The third key ($K_{AUF}'$) is derived by the authentication function entity based on the key ($K_{AUF}$) between the terminal device and the authentication function entity and the random number of the authentication function entity.

Correspondingly, in S212, the terminal device derives the third key ($K_{AUF}'$) based on the key ($K_{AUF}$) between the terminal device and the authentication function entity and the random number of the authentication function entity, and derives the communication key between the terminal device and the target AMF entity based on the third key ($K_{AUF}'$) and the random number of the target AMF entity.

It should be noted that, in case 3, in S211, the NAS SMC sent by the target AMF entity to the terminal device may further carry the random number of the terminal device. In this case, the random number of the terminal device is used only by the terminal device to detect replay, to prevent a replay attack.

Manner 4: In an implementation process of S210, the target AMF entity derives a sixth key ($K_{DH}$) using a key exchange algorithm based on a random number of the target AMF entity and the random number of the terminal device, and derives the communication key between the target AMF entity and the terminal device based on the third key ($K_{AUF}'$) and the sixth key ($K_{DH}$).

Further, in S211, the NAS SMC sent by the target AMF entity to the terminal device further carries the random number of the target AMF entity and the random number of the terminal device.

Case 1: The third key ($K_{AUF}'$) is derived by the authentication function entity based on the key ($K_{AUF}$) between the terminal device and the authentication function entity.

Correspondingly, in S212, the terminal device derives the third key ($K_{AUF}'$) based on the key ($K_{AUF}$) between the terminal device and the authentication function entity, derives the sixth key ($K_{DH}$) using the key exchange algorithm based on the random number of the target AMF entity and the random number of the terminal device, and derives the communication key between the terminal device and the target AMF entity based on the third key ($K_{AUF}'$) and the sixth key ($K_{DH}$). Similarly, in this case, the random number of the terminal device may be further used by the terminal device to detect replay, to prevent a replay attack.

Case 2: The third key ($K_{AUF}'$) is derived by the authentication function entity based on the key ($K_{AUF}$) between the terminal device and the authentication function entity and the random number of the terminal device.

Correspondingly, in S212, the terminal device derives the third key ($K_{AUF}'$) based on the key ($K_{AUF}$) between the terminal device and the authentication function entity and the random number of the terminal device, derives the sixth key ($K_{DH}$) using the key exchange algorithm based on the random number of the target AMF entity and the random number of the terminal device, and derives the communication key between the terminal device and the target AMF entity based on the third key ($K_{AUF}'$) and the sixth key ($K_{DH}$). Similarly, in this case, the random number of the terminal device may be further used by the terminal device to detect replay, to prevent a replay attack.

Case 3: The third key ($K_{AUF}'$) is derived by the authentication function entity based on the key ($K_{AUF}$) between the terminal device and the authentication function entity and the random number of the authentication function entity.

Correspondingly, in S212, the terminal device derives the third key ($K_{AUF}'$) based on the key ($K_{AUF}$) between the terminal device and the authentication function entity and the random number of the authentication function entity, derives the sixth key ($K_{DH}$) using the key exchange algorithm based on the random number of the target AMF entity and the random number of the terminal device, and derives the communication key between the terminal device and the target AMF entity based on the third key ($K_{AUF}'$) and the sixth key ($K_{DH}$). Similarly, in this case, the random number of the terminal device may be further used by the terminal device to detect replay, to prevent a replay attack.

Manner 5: In an implementation process of S210, the target AMF entity derives a key (which may be referred to as a seventh key and marked as $K_{nAUF}'$) based on the third key ($K_{AUF}'$) and a random number of the target AMF entity, derives a sixth key ($K_{DH}$) using a key exchange algorithm based on the random number of the target AMF entity and the random number of the terminal device, and derives the communication key between the target AMF entity and the terminal device based on the seventh key ($K_{nAUF}'$) and the sixth key ($K_{DH}$).

Further, in S211, the NAS SMC sent by the target AMF entity to the terminal device further carries the random number of the target AMF entity and the random number of the terminal device.

Case 1: The third key ($K_{AUF}'$) is derived by the authentication function entity based on the key ($K_{AUF}$) between the terminal device and the authentication function entity.

Correspondingly, in S212, the terminal device derives the third key ($K_{AUF}'$) based on the key ($K_{AUF}$) between the terminal device and the authentication function entity, derives the seventh key ($K_{nAUF}'$) based on the third key ($K_{AUF}'$) and the random number of the target AMF entity, derives the sixth key ($K_{DH}$) using the key exchange algorithm based on the random number of the target AMF entity and the random number of the terminal device, and derives the communication key between the terminal device and the target AMF entity based on the seventh key ($K_{nAUF}'$) and the sixth key ($K_{DH}$). Similarly, in this case, the random number of the terminal device may be further used by the terminal device to detect replay, to prevent a replay attack.

Case 2: The third key ($K_{AUF}'$) is derived by the authentication function entity based on the key ($K_{AUF}$) between the terminal device and the authentication function entity and the random number of the terminal device.

Correspondingly, in S212, the terminal device derives the third key ($K_{AUF}'$) based on the key ($K_{AUF}$) between the terminal device and the authentication function entity and the random number of the terminal device, derives the seventh key ($K_{nAUF}'$) based on the third key ($K_{AUF}'$) and the random number of the target AMF entity, derives the sixth key ($K_{DH}$) using the key exchange algorithm based on the random number of the target AMF entity and the random number of the terminal device, and derives the communication key between the terminal device and the target AMF entity based on the seventh key ($K_{nAUF}'$) and the sixth key ($K_{DH}$). Similarly, in this case, the random number of the terminal device may be further used by the terminal device to detect replay, to prevent a replay attack.

Case 3: The third key ($K_{AUF}'$) is derived by the authentication function entity based on the key ($K_{AUF}$) between the terminal device and the authentication function entity and the random number of the authentication function entity.

Correspondingly, in S212, the terminal device derives the third key ($K_{AUF}'$) based on the key ($K_{AUF}$) between the terminal device and the authentication function entity and the random number of the source AMF entity, derives the seventh key ($K_{nAUF}'$) based on the third key ($K_{AUF}'$) and the random number of the target AMF entity, derives the sixth key ($K_{DH}$) using the key exchange algorithm based on the random number of the target AMF entity and the random number of the terminal device, and derives the communication key between the terminal device and the target AMF entity based on the seventh key ($K_{nAUF}'$) and the sixth key ($K_{DH}$). Similarly, in this case, the random number of the terminal device may be further used by the terminal device to detect replay, to prevent a replay attack.

It should be noted that this embodiment imposes no limitation on the KDF used in the foregoing implementations.

Figure 3:
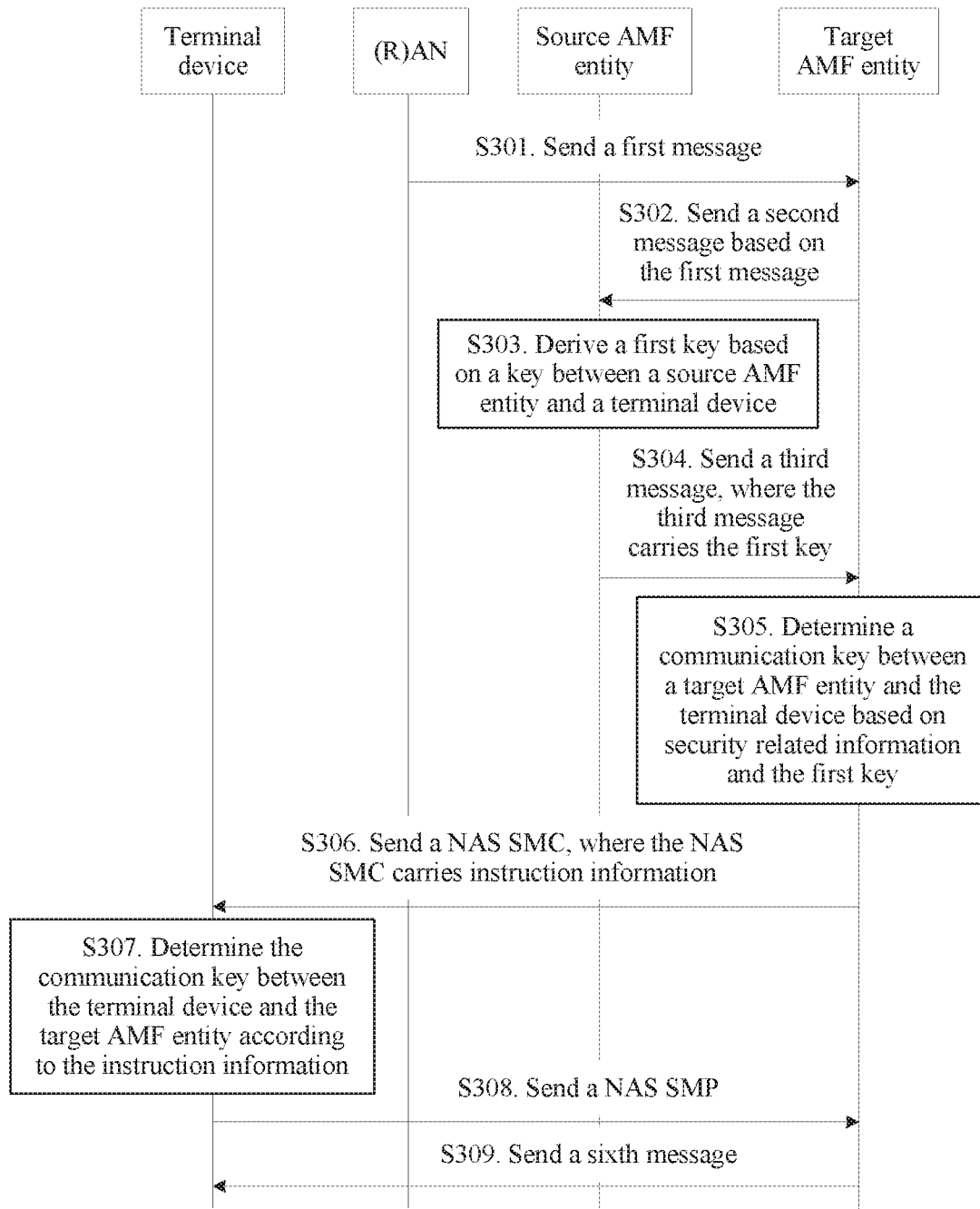
FIG. 3 is a schematic flowchart of a key obtaining method according to an embodiment of this application.

FIG. 3 is a schematic flowchart of a key obtaining method according to an embodiment of this application. In the key obtaining method provided in this embodiment, a target AMF entity determines a communication key between the target AMF entity and a terminal device based on security related information and an intermediate key sent by a source AMF entity, and instructs the terminal device to derive a corresponding key. In this way, key isolation is achieved between the target AMF entity and the source AMF entity. For a same or similar step and related detail, refer to descriptions of the foregoing embodiment in FIG. 2A and FIG. 2B. Details are not described again in this embodiment.

As shown in FIG. 3, the key obtaining method provided in this embodiment includes the following steps.

S301. A target AMF entity receives a first message.

The first message may be used to request to register a terminal device, and may be, for example, a registration request message. In FIG. 3, an example in which a (R)AN sends the first message to the target AMF entity is used for description.

S302. The target AMF entity sends a second message to a source AMF entity based on the first message.

The second message may be used to request a security context of the terminal device from the source AMF entity, the second message may be an information request message, and the second message includes an identifier of the terminal device.

S303. The source AMF entity derives a first key based on a key between the source AMF entity and a terminal device.

Optionally, the source AMF entity may derive the first key ($K_{oAMF}'$) using a KDF based on the key ($K_{oAMF}$) between the source AMF entity and the terminal device. For details, refer to related descriptions of the embodiment shown in FIG. 2A and FIG. 2B.

For example, the source AMF entity may derive the first key ($K_{oAMF}'$) using a KDF based on the key ($K_{oAMF}$) between the source AMF entity and the terminal device and a random number of the terminal device.

For another example, the source AMF entity may derive the first key ($K_{oAMF}'$) using a KDF based on the key ($K_{oAMF}$) between the source AMF entity and the terminal device and a random number of the source AMF entity.

S304. The target AMF entity receives a third message from the source AMF entity.

The third message may be used to respond to the second message. For example, the security context of the terminal device is sent to the target AMF entity using the third message. The third message may be an information response message. The third message carries the first key ($K_{oAMF}'$). For the first key, refer to related descriptions of the embodiment shown in FIG. 2A and FIG. 2B.

S305. The target AMF entity determines a communication key between the target AMF entity and the terminal device based on security related information and the first key.

In a possible case, when the security related information is a preconfigured policy and the policy is used to indicate to use a key received from the source AMF entity, or when the security related information is key isolation information of the target AMF entity and the key isolation information is used to indicate that a key of the target AMF entity is not totally isolated from a key of the source AMF entity, or when the security related information is a security status of the source AMF entity and the security status is used to indicate that the source AMF entity is secure, the target AMF entity determines the communication key between the target AMF entity and the terminal device based on the first key ($K_{oAMF}'$).

In another possible case, when the target AMF entity determines, based on the security related information, to use a key received from the source AMF entity, the target AMF entity determines the communication key between the target AMF entity and the terminal device based on the first key.

For an implementation in which the target AMF entity determines, based on the security related information, to use the key received from the source AMF entity, refer to related descriptions of S204 in the embodiment shown in FIG. 2A and FIG. 2B.

For an implementation in which the target AMF entity determines the communication key between the target AMF entity and the terminal device based on the first key ($K_{oAMF}'$), refer to related descriptions of step S205. Details are not described again.

S306. The target AMF entity sends a NAS SMC to the terminal device.

As described in the foregoing embodiment shown in FIG. 2A and FIG. 2B, the NAS SMC carries indication information, and the indication information is used to indicate the terminal device to derive the communication key between the terminal device and the target AMF entity based on the key ($K_{oAMF}$) between the source AMF entity and the terminal device.

S307. The terminal device determines the communication key between the terminal device and the target AMF entity according to indicateindication information.

For step S307, refer to a related implementation of S207. Details are not described again.

Optionally, the method further includes the following steps S308 and S309:

S308. The terminal device sends a NAS SMP to the target AMF entity.

S309. The target AMF entity sends a sixth message to the terminal device.

The sixth message is used to notify the terminal device that registration of the terminal device is accepted, and the sixth message may be a registration accept message.

In the key obtaining method provided in this embodiment, the target AMF entity determines the communication key between the target AMF entity and the terminal device based on the security related information using the intermediate key sent by the source AMF entity.

The intermediate key is obtained by the source AMF entity through derivation based on the key between the source AMF entity and the terminal device, and therefore the target AMF entity cannot learn of a communication key used between the source AMF entity and the terminal device. In this way, key isolation is achieved between the target AMF entity and the source AMF entity, thereby effectively avoiding a security risk and improving communication security.

Figure 4A:
FIG. 4A and FIG. 4B are schematic flowcharts of a key obtaining method according to an embodiment of this application.
Figure 4B:
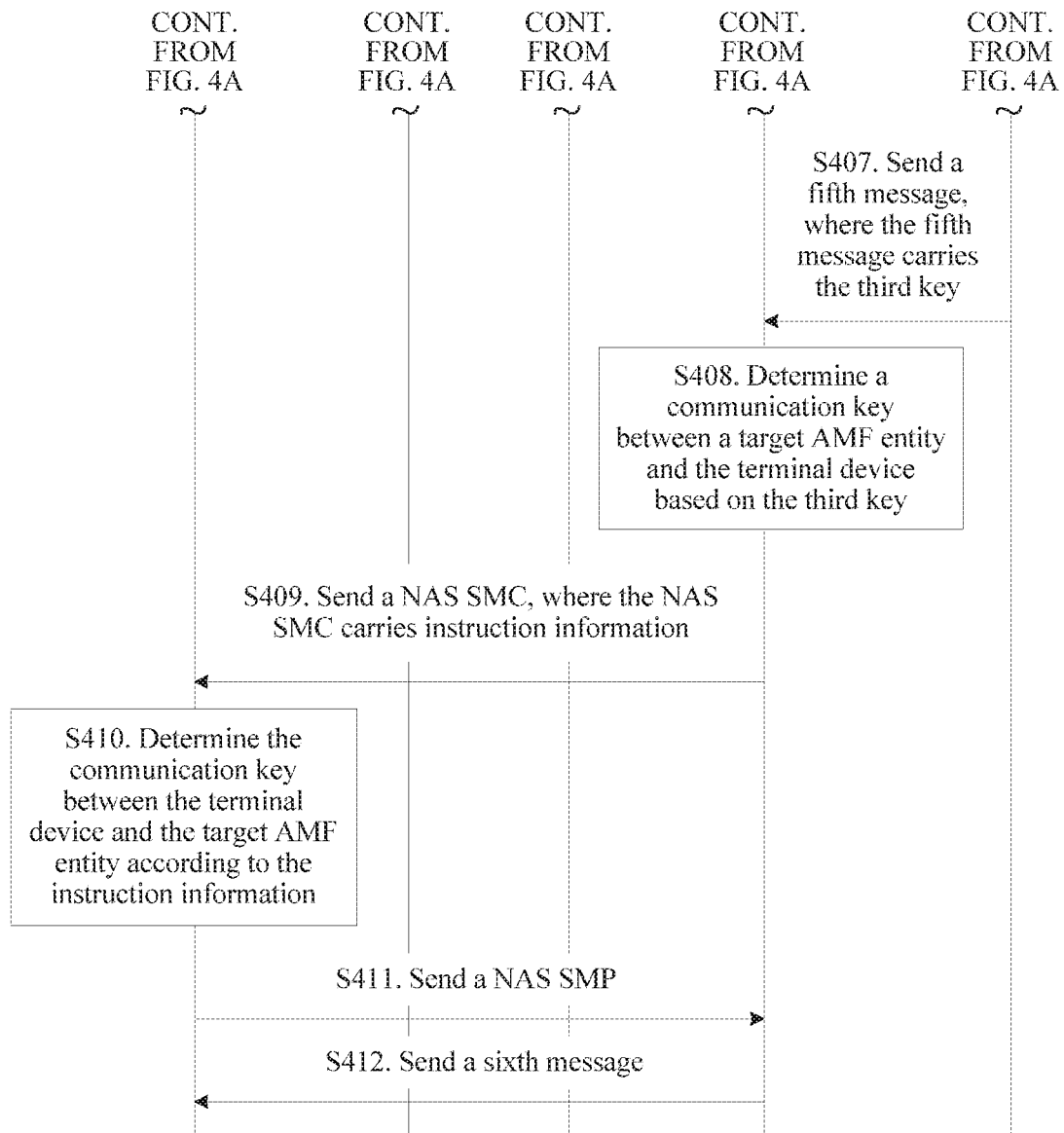

FIG. 4A and FIG. 4B are schematic flowcharts of a key obtaining method according to an embodiment of this application. In the key obtaining method provided in this embodiment, a target AMF entity requests a new key from an authentication function entity to determine a communication key between the target AMF entity and a terminal device, and instructs the terminal device to derive a corresponding key. In this way, key isolation is achieved between the target AMF entity and a source AMF entity. For a same or similar step and related detail, refer to descriptions of the foregoing embodiment in FIG. 2A and FIG. 2B. Details are not described again in this embodiment.

As shown in FIG. 4A and FIG. 4B, the key obtaining method provided in this embodiment includes the following steps.

S401. A target AMF entity receives a first message.

The first message may be used to request to register a terminal device, and the first message may be a registration request message. In the accompanying drawings corresponding to this embodiment, an example in which a (R)AN sends the first message to the target AMF entity is used for description.

S402. The target AMF entity sends a second message to a source AMF entity based on the first message.

The second message may be used to request a security context of the terminal device from the source AMF entity, the second message may be an information request message, and the second message may include an identifier of the terminal device.

S403. The source AMF entity derives a first key based on a key between the source AMF entity and a terminal device.

For the key between the source AMF entity and the terminal device, refer to related descriptions of step 203. Details are not described again.

S404. The target AMF entity receives a third message from the source AMF entity.

The third message may carry the first key. The third message may be used to respond to the second message. For example, the security context of the terminal device is sent to the target AMF entity using the third message. The third message may be an information response message, and the third message carries the first key.

S405. The target AMF entity sends a fourth message to an authentication function entity based on the third message.

The fourth message is used to request a key, the fourth message may be a key request message, and the fourth message includes the identifier of the terminal device.

The third message may carry an address of the authentication function entity, and the target AMF entity may send the fourth message to the authentication function entity based on the address. Obviously, the third message may be only used to trigger the target AMF entity to send the fourth message, and this is not limited.

Sending the fourth message to the authentication function entity in S405 may be implemented in the following manner:

Manner 1: The target AMF entity sends the fourth message to the authentication function entity based on security related information.

For the security related information, refer to related descriptions of the embodiment shown in FIG. 2A and FIG. 2B. Details are not described again.

In an example, when the security related information is a preconfigured policy and the policy is used to indicate to use a key received from the authentication function entity, the target AMF entity sends the fourth message to the authentication function entity.

In another example, when the security related information is key isolation information of the target AMF entity and the key isolation information is used to indicate that a key of the target AMF entity is totally isolated from a key of the source AMF entity, the target AMF entity sends the fourth message to the authentication function entity.

In still another example, when the security related information is a security status of the source AMF entity and the security status is used to indicate that the source AMF entity is not secure, the target AMF entity sends the fourth message to the authentication function entity.

Manner 2: When the target AMF entity determines, based on security related information, not to use a key received from the source AMF entity, the target AMF entity sends the fourth message to the authentication function entity.

For an implementation in which the target AMF entity determines, based on the security related information, not to use the key received from the source AMF entity, refer to related descriptions of S204 in the embodiment shown in FIG. 2A and FIG. 2B.

It should be noted that sending the fourth message to the authentication function entity in S405 may be replaced with manner 1 or manner 2.

Obviously, content included in the security related information may be used together. For details, refer to related descriptions of S204.

S406. The authentication function entity derives a third key based on a key shared between the authentication function entity and the terminal device.

For the key shared between the authentication function entity and the terminal device, refer to related descriptions of S208. Details are not described again.

Optionally, the authentication function entity may derive the third key ($K_{AUF}'$) using a KDF based on the key ($K_{AUF}$) shared between the authentication function entity and the terminal device. For details, refer to related descriptions of the embodiment shown in FIG. 2A and FIG. 2B.

Optionally, the authentication function entity may derive the third key ($K_{AUF}'$) using a KDF based on the key ($K_{AUF}$) shared between the authentication function entity and the terminal device and a random number of the terminal device. Further, the fourth message further includes the random number of the terminal device.

Optionally, the authentication function entity may derive the third key ($K_{AUF}'$) using a KDF based on the key ($K_{AUF}$) shared between the authentication function entity and the terminal device and a random number of the authentication function entity.

S407. The target AMF entity receives a fifth message from the authentication function entity.

The fifth message is used to respond to the fourth message, the fifth message may be a key response message, and the fifth message carries the third key ($K_{AUF}'$).

S408. The target AMF entity determines a communication key between the target AMF entity and the terminal device based on the third key.

S409. The target AMF entity sends a NAS SMC to the terminal device.

As described in the foregoing embodiment shown in FIG. 2A and FIG. 2B, the NAS SMC carries indication information, and the indication information is used to indicate the terminal device to derive the communication key between the terminal device and the target AMF entity based on the key ($K_{AUF}$) shared between the authentication function entity and the terminal device.

S410. The terminal device determines the communication key between the terminal device and the target AMF entity according to indicateindication information.

Optionally, the method further includes the following steps S411 and S412:

S411. The terminal device sends a NAS SMP to the target AMF entity.

S412. The target AMF entity sends a sixth message to the terminal device.

The sixth message may be used to notify the terminal device that registration of the terminal device is accepted, and may be, for example, a registration accept message.

In the key obtaining method provided in this embodiment, the target AMF entity directly requests a new key from the authentication function entity to determine the communication key between the target AMF entity and the terminal device. In this way, key isolation is achieved between the target AMF entity and the source AMF entity, thereby effectively avoiding a security risk and improving communication security.

Figure 5:
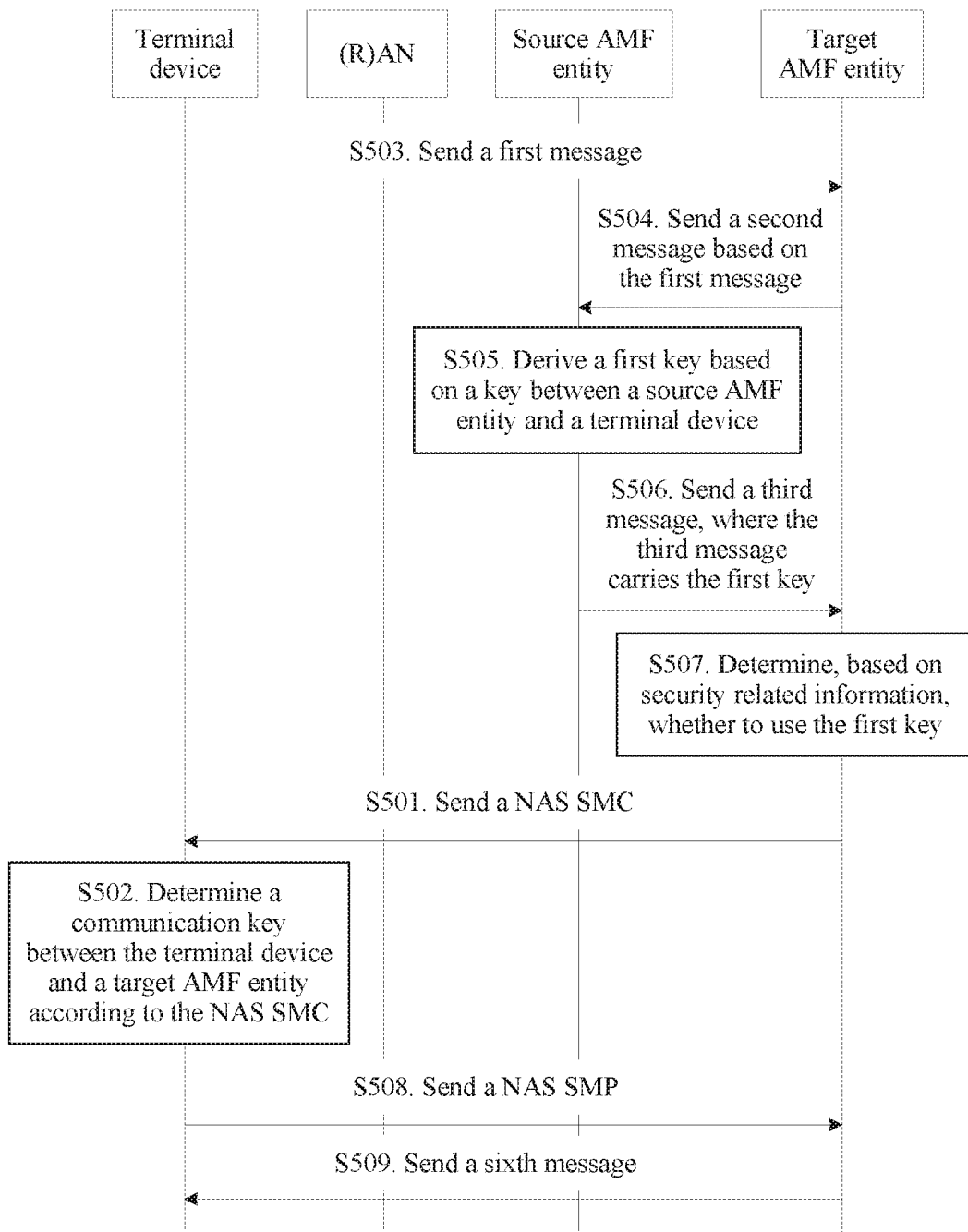
FIG. 5 is a schematic flowchart of a key obtaining method according to an embodiment of this application.

FIG. 5 is a schematic flowchart of a key obtaining method according to an embodiment of this application. The key obtaining method provided in this embodiment is performed by a terminal device, namely, a method used by the terminal device to obtain a key. In the key obtaining method provided in this embodiment, the terminal device derives a corresponding key according to a NAS SMC sent by a target AMF entity, such that a communication key between the terminal device and the target AMF entity is isolated from a communication key between the terminal device and a source AMF entity. For a same or similar step and related detail, refer to descriptions of the foregoing embodiment in FIG. 2A and FIG. 2B. Details are not described again in this embodiment.

As shown in FIG. 5, the key obtaining method provided in this embodiment includes the following steps.

S501. A terminal device receives a NAS SMC sent by a target AMF entity.

The NAS SMC may carry indication information, and the indication information is used to indicate the terminal device to derive a communication key between the terminal device and the target AMF entity based on a key between the terminal device and a source AMF entity, or the indication information is used to indicate the terminal device to derive a communication key between the terminal device and the target AMF entity based on a key shared between the terminal device and an authentication function entity.

For the communication key, the indication information, and the like, refer to related descriptions of the embodiment shown in FIG. 2A and FIG. 2B. Details are not described again.

S502. The terminal device determines a communication key between the terminal device and the target AMF entity according to the NAS SMC.

When the indication information is used to indicate the terminal device to derive the communication key between the terminal device and the target AMF entity based on the key between the terminal device and the source AMF entity, for an implementation process in which the terminal device determines the communication key between the terminal device and the target AMF entity, refer to the descriptions of S207 in the foregoing embodiment in FIG. 2A and FIG. 2B. Details are not described herein again.

When the indication information is used to indicate the terminal device to derive the communication key between the terminal device and the target AMF entity based on the key shared between the terminal device and the authentication function entity, for an implementation process in which the terminal device determines the communication key between the terminal device and the target AMF entity, refer to the descriptions of S212 in the foregoing embodiment in FIG. 2A and FIG. 2B. Details are not described herein again.

Optionally, before S501, the method further includes the following step.

S503. The terminal device sends a first message to the target AMF entity.

The first message may be used to request to register the terminal device, and the first message may be a registration request message.

In an example of this application, the terminal device may further send the first message to a (R)AN, and the (R)AN selects a target AMF entity for the terminal device based on the first message, for example, may select the target AMF entity based on an identifier of the terminal device carried in the first message, or may select the target AMF entity based on a radio access type (RAT) or network slice selection assistance information (NSSAI) in the first message, and sends the first message to the target AMF entity.

Further, after S503, the method may further include the following steps.

S504. The target AMF entity sends a second message to a source AMF entity based on the first message.

The second message may be used to request a security context of the terminal device from the source AMF entity, the second message may be an information request message, and the second message includes the identifier of the terminal device.

S505. The source AMF entity derives a first key based on a key between the source AMF entity and the terminal device.

S506. The source AMF entity sends a third message to the target AMF entity.

The third message may be used to respond to the second message, the third message may be used to send the security context of the terminal device to the target AMF entity, and the third message may be an information response message. As described in the foregoing embodiment shown in FIG. 2A and FIG. 2B, the third message carries the first key ($K_{oAMF}'$).

S507. The target AMF entity determines, based on security related information, whether to use the first key.

For example, if the target AMF entity determines, based on the security related information, to use the first key, the indication information carried in the NAS SMC that is sent by the target AMF entity and that is received by the terminal device in S501 is used to indicate the terminal device to derive the communication key between the terminal device and the target AMF entity based on the key between the terminal device and the source AMF entity.

For example, if the target AMF entity determines, based on the security related information, not to use the first key, the indication information carried in the NAS SMC that is sent by the target AMF entity and that is received by the terminal device in S501 is used to indicate the terminal device to derive the communication key between the terminal device and the target AMF entity based on the key shared between the terminal device and the authentication function entity.

Optionally, the method may further include the following steps.

S508. The terminal device sends a NAS SMP to the target AMF entity.

S509. The terminal device receives a sixth message from the target AMF entity.

The sixth message is used to notify the terminal device that registration of the terminal device is accepted, and the sixth message may be a registration accept message.

In the key obtaining method provided in this embodiment, the terminal device derives a corresponding key according to the NAS SMC sent by the target AMF entity, such that the communication key between the terminal device and the target AMF entity is isolated from the communication key between the terminal device and the source AMF entity. This can effectively avoid a security risk and improve communication security.

Based on the idea that is the same as that of the foregoing method embodiments, the embodiments of this application further provide a plurality of key obtaining apparatuses. The plurality of apparatuses may be implemented using software, hardware, or a combination of software and hardware, and may be configured to implement the key obtaining method provided in the foregoing method embodiments. The apparatus part corresponds to the foregoing method, and corresponding content and a technical effect of the apparatus part are the same as those of the foregoing method and are not described herein again.

Figure 6:
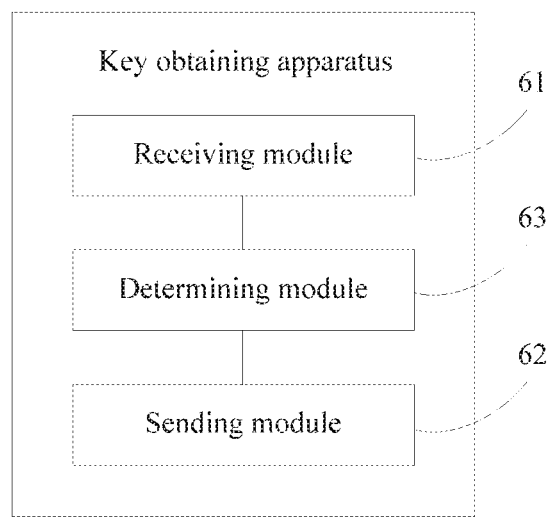
FIG. 6 is a schematic structural diagram of a key obtaining apparatus according to an embodiment of this application.

FIG. 6 is a schematic structural diagram of a key obtaining apparatus according to an embodiment of this application. As shown in FIG. 6, the apparatus may be implemented as a part or all of a target AMF entity using software, hardware, or a combination of software and hardware. The apparatus may include a receiving module 61, a sending module 62, and a determining module 63.

The receiving module 61 is configured to receive a first message, where the first message is used to request to register a terminal device.

The sending module 62 is configured to send a second message to a source AMF entity based on the first message, where the second message includes an identifier of the terminal device.

The receiving module 61 is further configured to receive a third message from the source AMF entity, where the third message is used to respond to the second message, the third message carries a first key ($K_{oAMF}'$), and the first key is obtained by the source AMF entity through derivation based on a key ($K_{oAMF}$) between the source AMF entity and the terminal device.

The determining module 63 is configured to determine a communication key between a target AMF entity and the terminal device based on security related information and the first key ($K_{oAMF}'$).

For example, the key between the source AMF entity and the terminal device includes a communication key between the source AMF entity and the terminal device or a key shared between the source AMF entity and the terminal device, and the key shared between the source AMF entity and the terminal device is an MSK, or a key generated based on an MSK, or a key generated based on a CK and an IK.

For example, the security related information may include: a preconfigured policy, where the policy is used to indicate to use a key received from the source AMF entity, or the policy is used to indicate to use a key received from an authentication function entity; or key isolation information of the target AMF entity, where the key isolation information is used to indicate whether a key of the target AMF entity is totally isolated from a key of the source AMF entity; or a security status of the source AMF entity, where the security status is used to indicate whether the source AMF entity is secure.

Optionally, in actual application, the determining module 63 may be configured such that when the security related information is the preconfigured policy and the policy is used to indicate to use the key received from the source AMF entity, the determining module 63 determines the communication key between the target AMF entity and the terminal device based on the first key ($K_{oAMF}'$). Alternatively, the determining module 63 may be configured such that when the security related information is the key isolation information of the target AMF entity and the key isolation information is used to indicate that the key of the target AMF entity is not totally isolated from the key of the source AMF entity, the determining module 63 determines the communication key between the target AMF entity and the terminal device based on the first key ($K_{oAMF}'$). Alternatively, the determining module 63 may be configured such that when the security related information is the security status of the source AMF entity and the security status is used to indicate that the source AMF entity is secure, the determining module 63 determines the communication key between the target AMF entity and the terminal device based on the first key ($K_{oAMF}'$). Alternatively, the determining module 63 may be configured such that when the target AMF entity determines, based on the security related information, to use the key received from the source AMF entity, the determining module 63 determines the communication key between the target AMF entity and the terminal device based on the first key ($K_{oAMF}'$).

Optionally, in actual application, the determining module 63 may be further configured such that when the security related information is the preconfigured policy and the policy is used to indicate to use the key received from the source AMF entity, the determining module 63 determines to use the key received from the source AMF entity. Alternatively, the determining module 63 may be further configured such that when the security related information is the key isolation information of the target AMF entity and the key isolation information is used to indicate that the key of the target AMF entity is not totally isolated from the key of the source AMF entity, the determining module 63 determines to use the key received from the source AMF entity. Alternatively, the determining module 63 may be further configured such that when the security related information is the security status of the source AMF entity and the security status is used to indicate that the source AMF entity is secure, the determining module 63 determines to use the key received from the source AMF entity.

Optionally, in actual application, the determining module 63 may use the first key ($K_{oAMF}'$) as the communication key between the target AMF entity and the terminal device.

Optionally, in actual application, the determining module 63 may derive the communication key between the target AMF entity and the terminal device based on the first key ($K_{oAMF}'$) and a random number of the terminal device.

Optionally, in actual application, the determining module 63 may derive the communication key between the target AMF entity and the terminal device based on the first key ($K_{oAMF}'$) and a random number of the target AMF entity.

Optionally, in actual application, the determining module 63 may derive a sixth key ($K_{DH}$) using a key exchange algorithm based on a random number of the target AMF entity and a random number of the terminal device, and derive the communication key between the target AMF entity and the terminal device based on the first key ($K_{oAMF}'$) and the sixth key ($K_{DH}$).

Optionally, in actual application, the determining module 63 may derive a sixth key ($K_{DH}$) using a key exchange algorithm based on a random number of the target AMF entity and a random number of the terminal device, derive a fifth key ($K_{nAMF}'$) based on the first key and the random number of the target AMF entity, and derive the communication key between the target AMF entity and the terminal device based on the sixth key ($K_{DH}$) and the fifth key ($K_{nAMF}'$).

In actual application, the first key ($K_{oAMF}'$) may be obtained by the source AMF entity through derivation based on the communication key between the source AMF entity and the terminal device and a random number of the source AMF entity.

In actual application, the first message may include the random number of the terminal device.

Optionally, in actual application, the sending module 62 may be further configured to send a NAS SMC to the terminal device, where the NAS SMC carries indication information, and the indication information is used to indicate the terminal device to derive the communication key between the terminal device and the target AMF entity using the key ($K_{oAMF}$) between the source AMF entity and the terminal device.

The key obtaining apparatus provided in this embodiment can perform functions performed by the target AMF entity in the method embodiment shown in FIG. 2A and FIG. 2B or FIG. 3. An implementation principle and a technical effect of this embodiment are similar to those of the method embodiment and are not described herein again.

Figure 7:
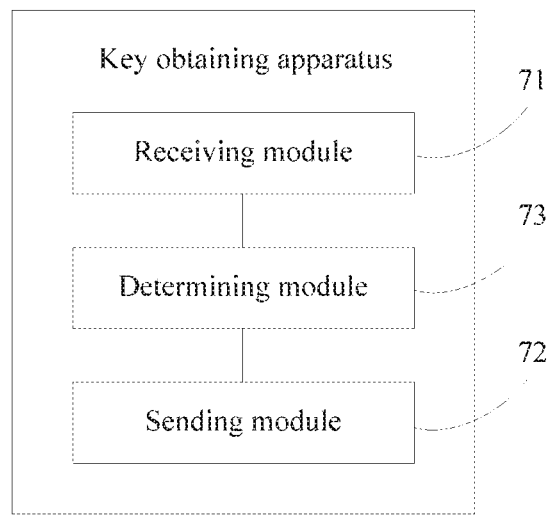
FIG. 7 is a schematic structural diagram of a key obtaining apparatus according to an embodiment of this application.

FIG. 7 is a schematic structural diagram of a key obtaining apparatus according to an embodiment of this application. As shown in FIG. 7, the apparatus may be implemented as a part or all of a target AMF entity using software, hardware, or a combination of software and hardware. The apparatus may include a receiving module 71, a sending module 72, and a determining module 73.

The receiving module 71 is configured to receive a first message, where the first message is used to request to register a terminal device.

The sending module 72 is configured to send a second message to a source AMF entity based on the first message, where the second message includes an identifier of the terminal device. The receiving module 71 is further configured to receive a third message from the source AMF entity, where the third message is used to respond to the second message.

The sending module 72 is further configured to send a fourth message to an authentication function entity based on the third message, where the fourth message is used to request a key, and the fourth message includes the identifier of the terminal device.

The receiving module 71 is further configured to receive a fifth message from the authentication function entity, where the fifth message carries a third key ($K_{AUF}'$), and the third key ($K_{AUF}'$) is obtained by the authentication function entity through derivation based on a key ($K_{AUF}$) shared between the authentication function entity and the terminal device.

The determining module 73 is configured to determine a communication key between a target AMF entity and the terminal device based on the third key ($K_{AUF}'$).

For example, the key shared between the authentication function entity and the terminal device is an EMSK, or a key generated based on an EMSK, or a key generated based on a CK and an IK.

For example, the sending module 72 may be configured to send the fourth message to the authentication function entity based on security related information. Alternatively, when the determining module 73 determines, based on the security related information, not to use a key received from the source AMF entity, the sending module 72 may be configured to send the fourth message to the authentication function entity.

In actual application, the security related information may include: a preconfigured policy, where the policy is used to indicate to use the key received from the source AMF entity, or the policy is used to indicate to use a key received from the authentication function entity; or key isolation information of the target AMF entity, where the key isolation information is used to indicate whether a key of the target AMF entity is totally isolated from a key of the source AMF entity; or a security status of the source AMF entity, where the security status is used to indicate whether the source AMF entity is secure.

Optionally, in actual application, the sending module 72 may be configured such that when the security related information is the preconfigured policy and the policy is used to indicate to use the key received from the authentication function entity, the sending module 72 sends the fourth message to the authentication function entity. Alternatively, the sending module 72 may be configured such that when the security related information is the key isolation information of the target AMF entity and the key isolation information is used to indicate that the key of the target AMF entity is totally isolated from the key of the source AMF entity, the sending module 72 sends the fourth message to the authentication function entity. Alternatively, the sending module 72 may be configured such that when the security related information is the security status of the source AMF entity and the security status is used to indicate that the source AMF entity is not secure, the sending module 72 sends the fourth message to the authentication function entity.

Optionally, in actual application, the determining module 73 may be further configured such that when the security related information is the preconfigured policy and the policy is used to indicate to use the key received from the source AMF entity, the determining module 73 determines not to use the key received from the source AMF entity. Alternatively, the determining module 73 may be further configured such that when the security related information is the key isolation information of the target AMF entity and the key isolation information is used to indicate that the key of the target AMF entity is not totally isolated from the key of the source AMF entity, the determining module 73 determines not to use the key received from the source AMF entity. Alternatively, the determining module 73 may be further configured such that when the security related information is the security status of the source AMF entity and the security status is used to indicate that the source AMF entity is secure, the determining module 73 determines not to use the key received from the source AMF entity.

Optionally, in actual application, the determining module 73 may use the third key ($K_{AUF}'$) as the communication key between the target AMF entity and the terminal device.

Optionally, in actual application, the determining module 73 may derive the communication key between the target AMF entity and the terminal device based on the third key ($K_{AUF}'$) and a random number of the terminal device.

Optionally, in actual application, the determining module 73 may derive the communication key between the target AMF entity and the terminal device based on the third key ($K_{AUF}'$) and a random number of the target AMF entity.

Optionally, in actual application, the determining module 73 may derive a sixth key ($K_{DH}$) using a key exchange algorithm based on a random number of the target AMF entity and a random number of the terminal device, and derive the communication key between the target AMF entity and the terminal device based on the third key ($K_{AUF}'$) and the sixth key ($K_{DH}$).

Optionally, in actual application, the determining module 73 may derive a sixth key ($K_{DH}$) using a key exchange algorithm based on a random number of the target AMF entity and a random number of the terminal device, derive a seventh key ($K_{nAUF}'$) based on the third key ($K_{AUF}'$) and the random number of the target AMF entity, and derive the communication key between the target AMF entity and the terminal device based on the sixth key ($K_{DH}$) and the seventh key ($K_{nAUF}'$).

Optionally, the third key ($K_{AUF}'$) is obtained by the authentication function entity through derivation based on the key shared between the authentication function entity and the terminal device and the random number of the terminal device.

Optionally, the third key ($K_{AUF}'$) is obtained by the authentication function entity through derivation based on the key shared between the authentication function entity and the terminal device and a random number of the authentication function entity.

Optionally, the first message includes the random number of the terminal device.

Optionally, in actual application, the sending module 72 may be further configured to send a NAS SMC to the terminal device, where the NAS SMC carries indication information, and the indication information is used to indicate the terminal device to derive the communication key between the terminal device and the target AMF entity based on the key shared between the authentication function entity and the terminal device.

The key obtaining apparatus provided in this embodiment can perform functions performed by the target AMF in the method embodiment shown in FIG. 2A and FIG. 2B or FIG. 4A and FIG. 4B. An implementation principle and a technical effect of this embodiment are similar to those of the method embodiment and are not described herein again.

Figure 8:
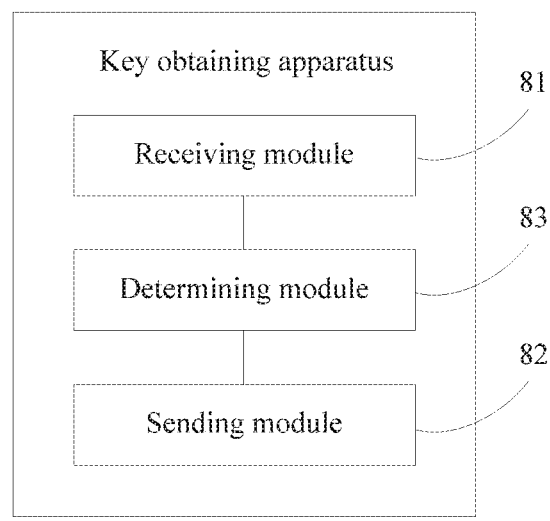
FIG. 8 is a schematic structural diagram of a key obtaining apparatus according to an embodiment of this application.

FIG. 8 is a schematic structural diagram of a key obtaining apparatus according to an embodiment of this application. As shown in FIG. 8, the apparatus may be implemented as a part or all of a terminal device using software, hardware, or a combination of software and hardware. The apparatus may include a receiving module 81 and a determining module 83.

The receiving module 81 is configured to receive a NAS SMC sent by a target AMF entity, where the NAS SMC carries indication information, and the indication information is used to indicate a terminal device to derive a communication key between the terminal device and the target AMF entity based on a key ($K_{oAMF}$) between the terminal device and a source AMF entity, or the indication information is used to indicate the terminal device to derive a communication key between the terminal device and the target AMF entity based on a key ($K_{AUF}$) shared between the terminal device and an authentication function entity.

The determining module 83 is configured to determine the communication key between the terminal device and the target AMF entity according to the indication information.

For example, the key between the source AMF entity and the terminal device includes a communication key between the source AMF entity and the terminal device or a key shared between the source AMF entity and the terminal device, and the key shared between the source AMF entity and the terminal device is a master session key MSK, or a key generated based on an MSK, or a key generated based on a cipher key CK and an integrity key IK.

For example, the key ($K_{AUF}$) shared between the authentication function entity and the terminal device is an EMSK, or a key generated based on an EMSK, or a key generated based on a CK and an IK.

In a first possible design, the determining module 83 is configured such that when the indication information is used to indicate the terminal device to derive the communication key between the terminal device and the target AMF entity based on the key ($K_{oAMF}$) between the terminal device and the source AMF entity, the determining module 83 derives a first key ($K_{oAMF}'$) based on the key ($K_{oAMF}$) between the terminal device and the source AMF entity, and uses the first key ($K_{oAMF}'$) as the communication key between the terminal device and the target AMF entity. Alternatively, the determining module 83 is configured such that when the indication information is used to indicate the terminal device to derive the communication key between the terminal device and the target AMF entity based on the key ($K_{AUF}$) shared between the terminal device and the authentication function entity, the determining module 83 derives a third key ($K_{AUF}'$) based on the key shared between the terminal device and the authentication function entity, and uses the third key ($K_{AUF}'$) as the communication key between the terminal device and the target AMF entity.

In a second possible design, the determining module 83 is configured such that when the indication information is used to indicate the terminal device to derive the communication key between the terminal device and the target AMF entity based on the key between the terminal device and the source AMF entity, the determining module 83 derives a first key ($K_{oAMF}'$) based on the key between the terminal device and the source AMF entity, and derives the communication key between the terminal device and the target AMF entity based on the first key ($K_{oAMF}'$) and a random number of the terminal device. Alternatively, the determining module 83 is configured such that when the indication information is used to indicate the terminal device to derive the communication key between the terminal device and the target AMF entity based on the key shared between the terminal device and the authentication function entity, the determining module 83 derives a third key ($K_{AUF}'$) based on the key shared between the terminal device and the authentication function entity, and derives the communication key between the terminal device and the target AMF entity based on the third key ($K_{AUF}'$) and a random number of the terminal device.

In a third possible design, the determining module 83 is configured such that when the indication information is used to indicate the terminal device to derive the communication key between the terminal device and the target AMF entity based on the key between the terminal device and the source AMF entity, the determining module 83 derives a first key ($K_{oAMF}'$) based on the key between the terminal device and the source AMF entity, and derives the communication key between the terminal device and the target AMF entity based on the first key ($K_{oAMF}'$) and a random number of the target AMF entity; Alternatively, the determining module 83 is configured such that when the indication information is used to indicate the terminal device to derive the communication key between the terminal device and the target AMF entity based on the key shared between the terminal device and the authentication function entity, the determining module 83 derives a third key ($K_{AUF}'$) based on the key shared between the terminal device and the authentication function entity, and derives the communication key between the terminal device and the target AMF entity based on the third key ($K_{AUF}'$) and a random number of the target AMF entity.

In a fourth possible design, the determining module 83 is configured such that when the indication information is used to indicate the terminal device to derive the communication key between the terminal device and the target AMF entity based on the key between the terminal device and the source AMF entity, the determining module 83 derives a first key ($K_{oAMF}'$) based on the key between the terminal device and the source AMF entity, derives a sixth key ($K_{DH}$) using a key exchange algorithm based on a random number of the target AMF entity and a random number of the terminal device, and derives the communication key between the terminal device and the target AMF entity based on the first key ($K_{oAMF}'$) and the sixth key ($K_{DH}$). Alternatively, the determining module 83 is configured such that when the indication information is used to indicate the terminal device to derive the communication key between the terminal device and the target AMF entity based on the key shared between the terminal device and the authentication function entity, the determining module 83 derives a third key ($K_{AUF}'$) based on the key shared between the terminal device and the authentication function entity, derives a sixth key ($K_{DH}$) using a key exchange algorithm based on a random number of the target AMF entity and a random number of the terminal device, and derives the communication key between the terminal device and the target AMF entity based on the third key ($K_{AUF}'$) and the sixth key ($K_{DH}$).

In a fifth possible design, the determining module 83 is configured such that when the indication information is used to indicate the terminal device to derive the communication key between the terminal device and the target AMF entity based on the key between the terminal device and the source AMF entity, the determining module 83 derives a first key ($K_{oAMF}'$) based on the key between the terminal device and the source AMF entity, derives a fifth key ($K_{nAMF}'$) based on the first key ($K_{oAMF}'$) and a random number of the target AMF entity, derives a sixth key ($K_{DH}$) using a key exchange algorithm based on the random number of the target AMF entity and a random number of the terminal device, and derives the communication key between the terminal device and the target AMF entity based on the fifth key ($K_{nAMF}'$) and the sixth key ($K_{DH}$). Alternatively, the determining module 83 is configured such that when the indication information is used to indicate the terminal device to derive the communication key between the terminal device and the target AMF entity based on the key shared between the terminal device and the authentication function entity, the determining module 83 derives a third key ($K_{AUF}'$) based on the key shared between the terminal device and the authentication function entity, derives a seventh key ($K_{nAUF}'$) based on the third key ($K_{AUF}'$) and a random number of the target AMF entity, derives a sixth key ($K_{DH}$) using a key exchange algorithm based on the random number of the target AMF entity and a random number of the terminal device, and derives the communication key between the terminal device and the target AMF entity based on the sixth key ($K_{DH}$) and the seventh key ($K_{nAUF}'$).

Optionally, in actual application, the determining module 83 may be further configured to: derive the first key ($K_{oAMF}'$) based on the key between the terminal device and the source AMF entity and the random number of the terminal device, or derive the first key ($K_{oAMF}'$) based on the key between the terminal device and the source AMF entity and a random number of the source AMF entity.

Optionally, in actual application, the determining module 83 may be further configured to: derive the third key ($K_{AUF}'$) based on the key shared between the terminal device and the authentication function entity and the random number of the terminal device, or derive the third key ($K_{AUF}'$) based on the key shared between the terminal device and the authentication function entity and a random number of the authentication function entity.

Optionally, the apparatus may further include a sending module 82. In actual application, the sending module 82 may be configured to send a first message to a (R)AN, where the first message is used to request to register the terminal device; or send a first message to the target AMF entity, where the first message is used to request to register the terminal device.

Further, the first message may carry the random number of the terminal device.

The key obtaining apparatus provided in this embodiment can perform functions performed by the terminal device in the foregoing method embodiment. An implementation principle and a technical effect of this embodiment are similar to those of the method embodiment and are not described herein again.

Figure 9:
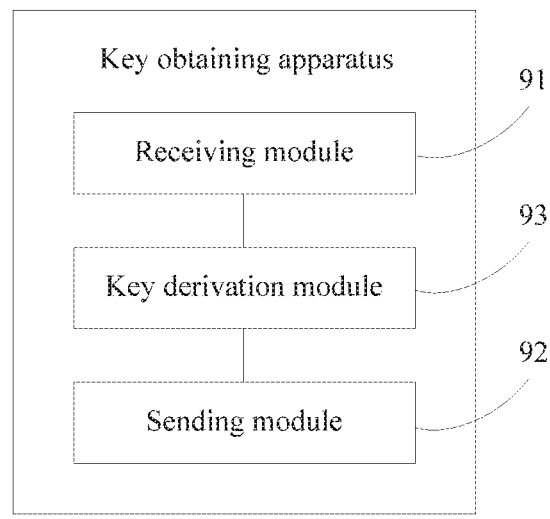
FIG. 9 is a schematic structural diagram of a key obtaining apparatus according to an embodiment of this application.

FIG. 9 is a schematic structural diagram of a key obtaining apparatus according to an embodiment of this application. As shown in FIG. 9, the apparatus may be implemented as a part or all of a source AMF entity using software, hardware, or a combination of software and hardware. The apparatus may include a receiving module 91, a sending module 92, and a key derivation module 93.

The receiving module 91 is configured to receive a second message from a target AMF entity, where the second message is used to request a security context of a terminal device, the second message may be an information request message, and the second message includes an identifier of the terminal device.

The key derivation module 93 is configured to derive a first key ($K_{oAMF}'$) based on a key ($K_{oAMF}$) between a source AMF entity and the terminal device.

The sending module 92 is configured to send a third message to the target AMF entity, where the third message is used to respond to the second message, the third message is used to send the security context of the terminal device to the target AMF entity, the third message may be an information response message, and the third message carries the first key ($K_{oAMF}'$).

For example, the key between the source AMF entity and the terminal device includes a communication key between the source AMF entity and the terminal device or a key shared between the source AMF entity and the terminal device, and the key shared between the source AMF entity and the terminal device is an MSK, or a key generated based on an MSK, or a key generated based on a CK and an IK.

Optionally, in actual application, the key derivation module 93 may be configured to derive the first key ($K_{oAMF}'$) using a KDF based on the key ($K_{oAMF}$) between the source AMF entity and the terminal device.

Optionally, in actual application, the key derivation module 93 may be configured to derive the first key ($K_{oAMF}'$) using a KDF based on the key ($K_{oAMF}$) between the source AMF entity and the terminal device and a random number of the terminal device.

Optionally, the second message may carry the random number of the terminal device.

Optionally, in actual application, the key derivation module 93 may be configured to derive the first key ($K_{oAMF}'$) using a KDF based on the key ($K_{oAMF}$) between the source AMF entity and the terminal device and a random number of the source AMF entity.

The key obtaining apparatus provided in this embodiment can perform functions performed by the source AMF entity in the foregoing method embodiment. An implementation principle and a technical effect of this embodiment are similar to those of the method embodiment and are not described herein again.

Figure 10:
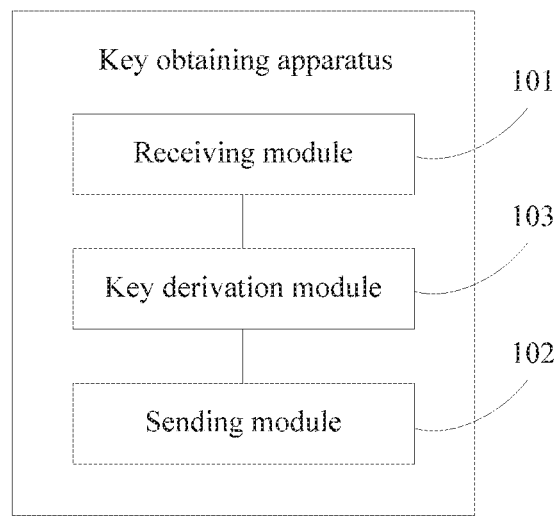
FIG. 10 is a schematic structural diagram of a key obtaining apparatus according to an embodiment of this application.

FIG. 10 is a schematic structural diagram of a key obtaining apparatus according to an embodiment of this application. As shown in FIG. 10, the apparatus may be implemented as a part or all of an authentication function entity using software, hardware, or a combination of software and hardware. The apparatus may include a receiving module 101, a sending module 102, and a key derivation module 103.

The receiving module 101 is configured to receive a fourth message sent by an AMF entity, where the fourth message is used to request a key, the fourth message may be a key request message, and the fourth message includes an identifier of a terminal device.

The key derivation module 103 is configured to derive a third key ($K_{AUF}'$) based on a key ($K_{AUF}$) shared between an authentication function entity and the terminal device.

The sending module 102 is configured to send a fifth message to the target AMF entity, where the fifth message is used to respond to the fourth message, the fifth message may be a key response message, and the fifth message carries the third key ($K_{AUF}'$).

For example, the key ($K_{AUF}$) shared between the authentication function entity and the terminal device is an EMSK, or a key generated based on an EMSK, or a key generated based on a CK and an IK.

Optionally, in actual application, the key derivation module 103 may be configured to derive the third key ($K_{AUF}'$) using a KDF based on the key ($K_{AUF}$) shared between the authentication function entity and the terminal device.

Optionally, in actual application, the key derivation module 103 may be configured to derive the third key ($K_{AUF}'$) using a KDF based on the key ($K_{AUF}$) shared between the authentication function entity and the terminal device and a random number of the terminal device.

Optionally, the fourth message may carry the random number of the terminal device.

Optionally, in actual application, the key derivation module 103 may be configured to derive the third key ($K_{AUF}'$) using a KDF based on the key ($K_{AUF}$) shared between the authentication function entity and the terminal device and a random number of the authentication function entity.

The key obtaining apparatus provided in this embodiment can perform functions performed by the authentication function entity in the foregoing method embodiment. An implementation principle and a technical effect of this embodiment are similar to those of the method embodiment and are not described herein again.

Based on the idea that is the same as that of the foregoing method embodiments, the embodiments of this application further provide a plurality of network devices and a terminal device. The plurality of network devices and the terminal device may be configured to implement the key obtaining method provided in the foregoing method embodiments. The device part corresponds to the foregoing method, and corresponding content and a technical effect of the device part are the same as those of the foregoing method and are not described herein again.

Figure 11:
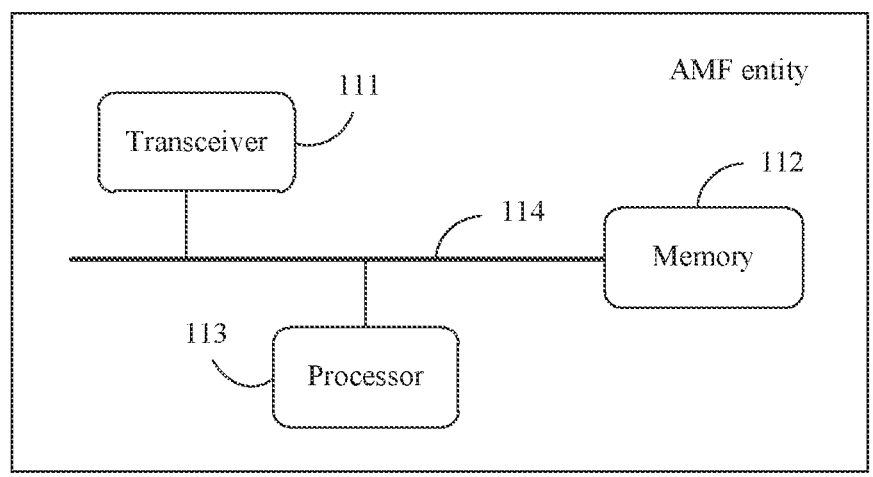
FIG. 11 is a schematic structural diagram of an AMF entity according to an embodiment of this application.

FIG. 11 is a schematic structural diagram of an AMF entity according to an embodiment of this application. As shown in FIG. 11, the AMF entity includes a transceiver 111, a memory 112, a processor 113, and at least one communications bus 114.

The memory 112 stores a software program, the memory 112 may include a high-speed RAM memory, and may further include a non-volatile memory NVM, for example, at least one magnetic disk memory, and the memory 112 may store various programs, to complete various processing functions and implement method steps in this embodiment. The processor 113 is coupled to the memory 112, and the communications bus 114 is configured to implement communication connection between elements. Optionally, the transceiver 111 in this embodiment may be a radio frequency module, a baseband module, or a communication interface module.

In this embodiment, the transceiver 111 is configured to: receive a first message, where the first message is used to request to register a terminal device; send a second message to a source AMF entity based on the first message, where the second message includes an identifier of the terminal device; and receive a third message from the source AMF entity, where the third message is used to respond to the second message, the third message carries a first key ($K_{oAMF}*$), and the first key ($K_{oAMF}'$) is obtained by the source AMF entity through derivation based on a key ($K_{oAMF}$) between the source AMF entity and the terminal device.

For example, the key between the source AMF entity and the terminal device includes a communication key between the source AMF entity and the terminal device or a key shared between the source AMF entity and the terminal device, and the key shared between the source AMF entity and the terminal device is an MSK, or a key generated based on an MSK, or a key generated based on a CK and an IK.

In this embodiment, the processor 113 is configured to determine a communication key between the AMF entity and the terminal device based on security related information and the first key ($K_{oAMF}'$).

For example, the security related information may include: a preconfigured policy, where the policy is used to indicate to use a key received from the source AMF entity, or the policy is used to indicate to use a key received from an authentication function entity; or key isolation information of the AMF entity, where the key isolation information is used to indicate whether a key of the AMF entity is totally isolated from a key of the source AMF entity; or a security status of the source AMF entity, where the security status is used to indicate whether the source AMF entity is secure.

Optionally, in actual application, the processor 113 may be configured such that when the security related information is the preconfigured policy and the policy is used to indicate to use the key received from the source AMF entity, or when the security related information is the key isolation information of the AMF entity and the key isolation information is used to indicate that the key of the AMF entity is not totally isolated from the key of the source AMF entity, or when the security related information is the security status of the source AMF entity and the security status is used to indicate that the source AMF entity is secure, the processor 113 determines the communication key between the AMF entity and the terminal device based on the first key ($K_{oAMF}'$); or when the AMF entity determines, based on the security related information, to use the key received from the source AMF entity, the processor 113 determines the communication key between the AMF entity and the terminal device based on the first key ($K_{oAMF}'$).

Optionally, in actual application, the processor 113 may be further configured such that when the security related information is the preconfigured policy and the policy is used to indicate to use the key received from the source AMF entity, the processor 113 determines to use the key received from the source AMF entity; or when the security related information is the key isolation information of the AMF entity and the key isolation information is used to indicate that the key of the AMF entity is not totally isolated from the key of the source AMF entity, the processor 113 determines to use the key received from the source AMF entity; or when the security related information is the security status of the source AMF entity and the security status is used to indicate that the source AMF entity is secure, the processor 113 determines to use the key received from the source AMF entity.

Optionally, in actual application, the processor 113 may use the first key ($K_{oAMF}'$) as the communication key between the AMF entity and the terminal device.

Optionally, in actual application, the processor 113 may derive the communication key between the AMF entity and the terminal device based on the first key ($K_{oAMF}'$) and a random number of the terminal device.

Optionally, in actual application, the processor 113 may derive the communication key between the AMF entity and the terminal device based on the first key ($K_{oAMF}'$) and a random number of the AMF entity.

Optionally, in actual application, the processor 113 may derive a sixth key ($K_{DH}$) using a key exchange algorithm based on a random number of the AMF entity and a random number of the terminal device, and derive the communication key between the AMF entity and the terminal device based on the first key ($K_{oAMF}'$) and the sixth key ($K_{OH}$).

Optionally, in actual application, the processor 113 may derive a sixth key ($K_{DH}$) using a key exchange algorithm based on a random number of the AMF entity and a random number of the terminal device, derive a fifth key ($K_{nAMF}'$) based on the first key and the random number of the AMF entity, and derive the communication key between the AMF entity and the terminal device based on the sixth key ($K_{DH}$) and the fifth key ($K_{nAMF}'$).

In actual application, the first key ($K_{oAMF}'$) may be obtained by the source AMF entity through derivation based on the communication key between the source AMF entity and the terminal device and a random number of the source AMF entity.

In actual application, the first key ($K_{oAMF}'$) may be obtained by the source AMF entity through derivation based on the communication key between the source AMF entity and the terminal device and a random number of the source AMF entity.

In actual application, the first message may include the random number of the terminal device.

Optionally, in actual application, the transceiver 111 may be further configured to send a NAS SMC to the terminal device, where the NAS SMC carries indication information, and the indication information is used to indicate the terminal device to derive the communication key between the terminal device and the AMF entity using the key ($K_{oAMF}$) between the source AMF entity and the terminal device.

The AMF entity provided in this embodiment can perform functions performed by the target AMF in the foregoing method embodiment. An implementation principle and a technical effect of this embodiment are similar to those of the method embodiment and are not described herein again.

Figure 12:
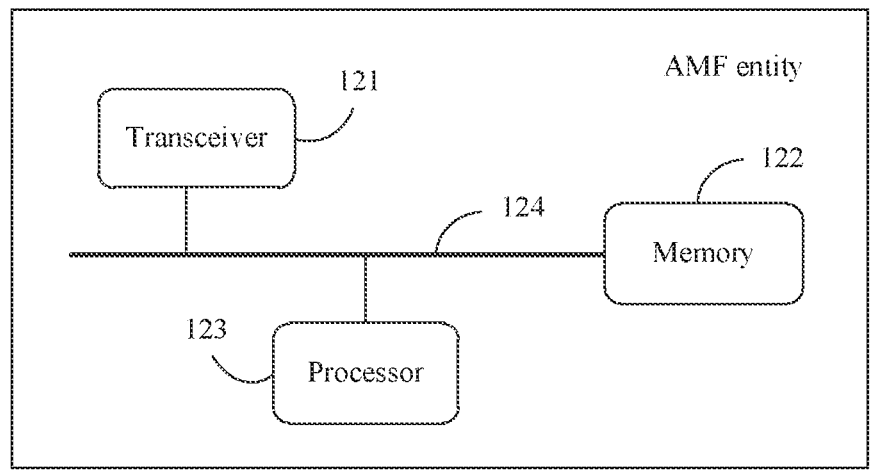
FIG. 12 is a schematic structural diagram of an AMF entity according to an embodiment of this application.

FIG. 12 is a schematic structural diagram of an AMF entity according to an embodiment of this application. As shown in FIG. 12, the AMF entity includes a transceiver 121, a memory 122, a processor 123, and at least one communications bus 124.

The memory 122 stores a software program, the memory 122 may include a high-speed RAM memory, and may further include a non-volatile memory NVM, for example, at least one magnetic disk memory, and the memory 122 may store various programs, to complete various processing functions and implement method steps in this embodiment. The processor 123 is coupled to the memory 122, and the communications bus 124 is configured to implement communication connection between elements. Optionally, the transceiver 121 in this embodiment may be a radio frequency module, a baseband module, or a communication interface module on a network device.

In this embodiment, the transceiver 121 is configured to: receive a first message, where the first message is used to request to register a terminal device; send a second message to a source AMF entity based on the first message, where the second message includes an identifier of the terminal device; receive a third message from the source AMF entity, where the third message is used to respond to the second message; send a fourth message to an authentication function entity based on the third message, where the fourth message is used to request a key, and the fourth message includes the identifier of the terminal device; and receive a fifth message from the authentication function entity, where the fifth message carries a third key ($K_{AUF}'$), and the third key ($K_{AUF}'$) is obtained by the authentication function entity through derivation based on a key ($K_{AUF}$) shared between the authentication function entity and the terminal device.

In this embodiment, the processor 123 is configured to determine a communication key between the AMF entity and the terminal device based on the third key ($K_{AUF}'$).

For example, the key shared between the authentication function entity and the terminal device is an EMSK, or a key generated based on an EMSK, or a key generated based on a CK and an IK.

For example, the transceiver 121 may be configured to: send the fourth message to the authentication function entity based on security related information; or when the processor 123 determines, based on the security related information, not to use a key received from the source AMF entity, send the fourth message to the authentication function entity.

For example, the security related information may include: a preconfigured policy, where the policy is used to indicate to use the key received from the source AMF entity, or the policy is used to indicate to use a key received from the authentication function entity; or key isolation information of the AMF entity, where the key isolation information is used to indicate whether a key of the AMF entity is totally isolated from a key of the source AMF entity; or a security status of the source AMF entity, where the security status is used to indicate whether the source AMF entity is secure.

Optionally, in actual application, the transceiver 121 may be configured such that when the security related information is the preconfigured policy and the policy is used to indicate to use the key received from the authentication function entity, the transceiver 121 sends the fourth message to the authentication function entity; or when the security related information is the key isolation information of the AMF entity and the key isolation information is used to indicate that the key of the AMF entity is totally isolated from the key of the source AMF entity, the transceiver 121 sends the fourth message to the authentication function entity; or when the security related information is the security status of the source AMF entity and the security status is used to indicate that the source AMF entity is not secure, the transceiver 121 sends the fourth message to the authentication function entity.

Optionally, in actual application, the processor 123 may be further configured such that when the security related information is the preconfigured policy and the policy is used to indicate to use the key received from the source AMF entity, the processor 123 determines not to use the key received from the source AMF entity; or when the security related information is the key isolation information of the AMF entity and the key isolation information is used to indicate that the key of the AMF entity is not totally isolated from the key of the source AMF entity, the processor 123 determines not to use the key received from the source AMF entity; or when the security related information is the security status of the source AMF entity and the security status is used to indicate that the source AMF entity is secure, the processor 123 determines not to use the key received from the source AMF entity.

Optionally, in actual application, the processor 123 may use the third key ($K_{AUF}'$) as the communication key between the AMF entity and the terminal device.

Optionally, in actual application, the processor 123 may derive the communication key between the AMF entity and the terminal device based on the third key ($K_{AUF}'$) and a random number of the terminal device.

Optionally, in actual application, the processor 123 may derive the communication key between the AMF entity and the terminal device based on the third key ($K_{AUF}'$) and a random number of the AMF entity.

Optionally, in actual application, the processor 123 may derive a sixth key ($K_{DH}$) using a key exchange algorithm based on a random number of the AMF entity and a random number of the terminal device, and derive the communication key between the AMF entity and the terminal device based on the third key ($K_{AUF}'$) and the sixth key ($K_{DH}$).

Optionally, in actual application, the processor 123 may derive a sixth key ($K_{DH}$) using a key exchange algorithm based on a random number of the AMF entity and a random number of the terminal device, derive a seventh key ($K_{nAUF}'$) based on the third key ($K_{AUF}'$) and the random number of the AMF entity, and derive the communication key between the AMF entity and the terminal device based on the sixth key ($K_{DH}$) and the seventh key ($K_{nAUF}'$).

Optionally, the third key ($K_{AUF}'$) is obtained by the authentication function entity through derivation based on the key shared between the authentication function entity and the terminal device and the random number of the terminal device.

Optionally, the third key ($K_{AUF}'$) is obtained by the authentication function entity through derivation based on the key shared between the authentication function entity and the terminal device and a random number of the authentication function entity.

Optionally, the first message includes the random number of the terminal device.

Optionally, in actual application, the transceiver 121 may be further configured to send a NAS SMC to the terminal device, where the NAS SMC carries indication information, and the indication information is used to indicate the terminal device to derive the communication key between the terminal device and the AMF entity based on the key shared between the authentication function entity and the terminal device.

The AMF entity provided in this embodiment can perform functions performed by the target AMF entity in the foregoing method embodiment. An implementation principle and a technical effect of this embodiment are similar to those of the method embodiment and are not described herein again.

Figure 13:
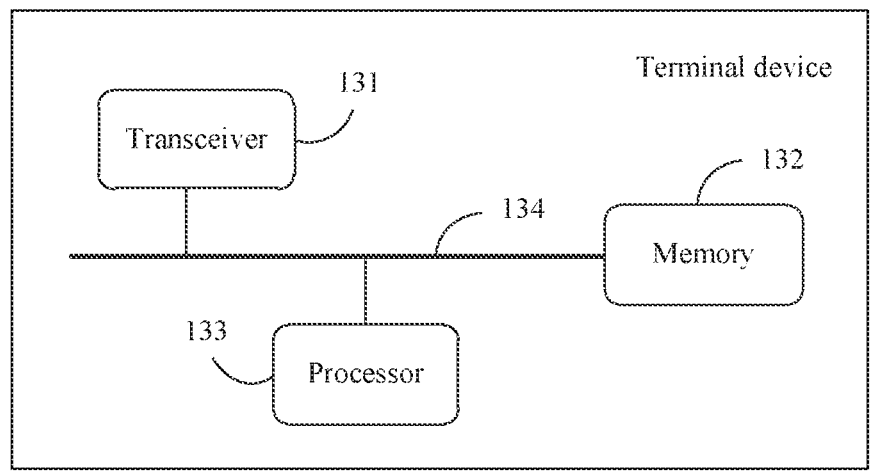
FIG. 13 is a schematic structural diagram of a terminal device according to an embodiment of this application.

FIG. 13 is a schematic structural diagram of a terminal device according to an embodiment of this application. As shown in FIG. 13, the terminal device includes a transceiver 131, a memory 132, a processor 133, and at least one communications bus 134.

The memory 132 stores a software program, the memory 132 may include a high-speed RAM memory, and may further include a non-volatile memory NVM, for example, at least one magnetic disk memory, and the memory 132 may store various programs, to complete various processing functions and implement method steps in this embodiment. The processor 133 is coupled to the memory 132, and the communications bus 134 is configured to implement communication connection between elements. Optionally, the transceiver 131 in this embodiment may be a radio frequency module or a baseband module on the terminal device.

In this embodiment, the transceiver 131 is configured to receive a NAS SMC sent by a target AMF entity, where the NAS SMC carries indication information, and the indication information is used to indicate a terminal device to derive a communication key between the terminal device and the target AMF entity based on a key ($K_{oAMF}$) between the terminal device and a source AMF entity, or the indication information is used to indicate the terminal device to derive a communication key between the terminal device and the target AMF entity based on a key ($K_{AUF}$) shared between the terminal device and an authentication function entity.

In this embodiment, the processor 133 is configured to determine the communication key between the terminal device and the target AMF entity according to the indication information.

For example, the key between the source AMF entity and the terminal device includes a communication key between the source AMF entity and the terminal device or a key shared between the source AMF entity and the terminal device, and the key shared between the source AMF entity and the terminal device is an MSK, or a key generated based on an MSK, or a key generated based on a CK and an IK.

For example, the key ($K_{AUF}$) shared between the authentication function entity and the terminal device is an EMSK, or a key generated based on an EMSK, or a key generated based on a CK and an IK.

In a first possible design, the processor 133 is configured such that when the indication information is used to indicate the terminal device to derive the communication key between the terminal device and the target AMF entity based on the key ($K_{oAMF}$) between the terminal device and the source AMF entity, the processor 133 derives a first key ($K_{oAMF}'$) based on the key ($K_{oAMF}$) between the terminal device and the source AMF entity, and uses the first key ($K_{oAMF}'$) as the communication key between the terminal device and the target AMF entity; or when the indication information is used to indicate the terminal device to derive the communication key between the terminal device and the target AMF entity based on the key ($K_{AUF}$) shared between the terminal device and the authentication function entity, the processor 133 derives a third key ($K_{AUF}'$) based on the key shared between the terminal device and the authentication function entity, and uses the third key ($K_{AUF}'$) as the communication key between the terminal device and the target AMF entity.

In a second possible design, the processor 133 is configured such that when the indication information is used to indicate the terminal device to derive the communication key between the terminal device and the target AMF entity based on the key between the terminal device and the source AMF entity, the processor 133 derives a first key ($K_{oAMF}'$) based on the key between the terminal device and the source AMF entity, and derives the communication key between the terminal device and the target AMF entity based on the first key ($K_{oAMF}'$) and a random number of the terminal device; or when the indication information is used to indicate the terminal device to derive the communication key between the terminal device and the target AMF entity based on the key shared between the terminal device and the authentication function entity, the processor 133 derives a third key ($K_{AUF}'$) based on the key shared between the terminal device and the authentication function entity, and derives the communication key between the terminal device and the target AMF entity based on the third key ($K_{AUF}'$) and a random number of the terminal device.

In a third possible design, the processor 133 is configured such that when the indication information is used to indicate the terminal device to derive the communication key between the terminal device and the target AMF entity based on the key between the terminal device and the source AMF entity, the processor 133 derives a first key ($K_{oAMF}'$) based on the key between the terminal device and the source AMF entity, and derives the communication key between the terminal device and the target AMF entity based on the first key ($K_{oAMF}'$) and a random number of the target AMF entity; or when the indication information is used to indicate the terminal device to derive the communication key between the terminal device and the target AMF entity based on the key shared between the terminal device and the authentication function entity, the processor 133 derives a third key ($K_{AUF}'$) based on the key shared between the terminal device and the authentication function entity, and derives the communication key between the terminal device and the target AMF entity based on the third key ($K_{AUF}'$) and a random number of the target AMF entity.

In a fourth possible design, the processor 133 is configured such that when the indication information is used to indicate the terminal device to derive the communication key between the terminal device and the target AMF entity based on the key between the terminal device and the source AMF entity, the processor 133 derives a first key ($K_{oAMF}'$) based on the key between the terminal device and the source AMF entity, derives a sixth key ($K_{DH}$) using a key exchange algorithm based on a random number of the target AMF entity and a random number of the terminal device, and derives the communication key between the terminal device and the target AMF entity based on the first key ($K_{oAMF}'$) and the sixth key ($K_{DH}$); or when the indication information is used to indicate the terminal device to derive the communication key between the terminal device and the target AMF entity based on the key shared between the terminal device and the authentication function entity, the processor 133 derives a third key ($K_{AUF}'$) based on the key shared between the terminal device and the authentication function entity, derives a sixth key ($K_{DH}$) using a key exchange algorithm based on a random number of the target AMF entity and a random number of the terminal device, and derives the communication key between the terminal device and the target AMF entity based on the third key ($K_{AUF}'$) and the sixth key ($K_{DH}$).

In a fifth possible design, the processor 133 is configured such that when the indication information is used to indicate the terminal device to derive the communication key between the terminal device and the target AMF entity based on the key between the terminal device and the source AMF entity, the processor 133 derives a first key ($K_{oAMF}'$) based on the key between the terminal device and the source AMF entity, derives a fifth key ($K_{nAMF}'$) based on the first key ($K_{oAMF}'$) and a random number of the target AMF entity, derives a sixth key ($K_{DH}$) using a key exchange algorithm based on the random number of the target AMF entity and a random number of the terminal device, and derives the communication key between the terminal device and the target AMF entity based on the fifth key ($K_{nAMF}'$) and the sixth key ($K_{DH}$); or when the indication information is used to indicate the terminal device to derive the communication key between the terminal device and the target AMF entity based on the key shared between the terminal device and the authentication function entity, the processor 133 derives a third key ($K_{AUF}'$) based on the key shared between the terminal device and the authentication function entity, derives a seventh key ($K_{nAUF}'$) based on the third key ($K_{AUF}'$) and a random number of the target AMF entity, derives a sixth key ($K_{DH}$) using a key exchange algorithm based on the random number of the target AMF entity and a random number of the terminal device, and derives the communication key between the terminal device and the target AMF entity based on the sixth key ($K_{DH}$) and the seventh key ($K_{nAUF}'$).

Optionally, in actual application, the processor 133 may be further configured to: derive the first key ($K_{oAMF}'$) based on the key between the terminal device and the source AMF entity and the random number of the terminal device, or derive the first key ($K_{oAMF}'$) based on the key between the terminal device and the source AMF entity and a random number of the source AMF entity.

Optionally, in actual application, the processor 133 may be further configured to: derive the third key ($K_{AUF}'$) based on the key shared between the terminal device and the authentication function entity and the random number of the terminal device, or derive the third key ($K_{AUF}'$) based on the key shared between the terminal device and the authentication function entity and a random number of the authentication function entity.

Optionally, in actual application, the transceiver 131 may be configured to send a first message to a (R)AN, where the first message is used to request to register the terminal device; or send a first message to the target AMF entity, where the first message is used to request to register the terminal device.

Further, the first message may carry the random number of the terminal device.

The terminal device provided in this embodiment can perform functions performed by the terminal device in the foregoing method embodiment. An implementation principle and a technical effect of this embodiment are similar to those of the method embodiment and are not described herein again.

Figure 14:
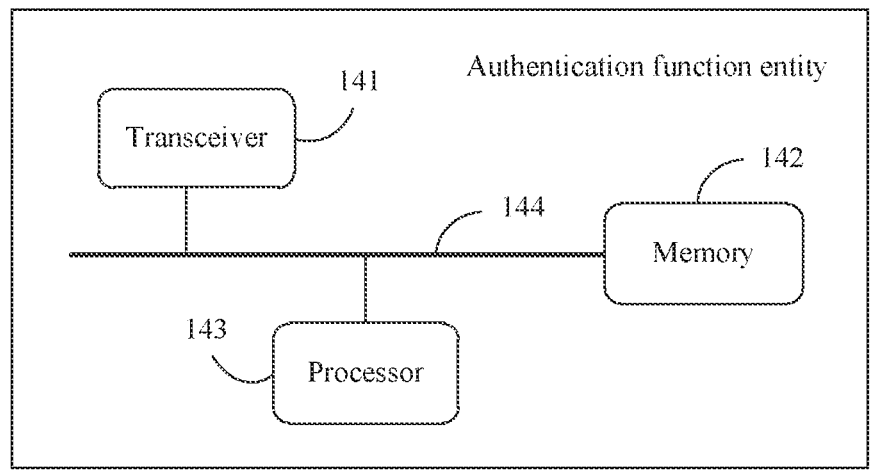
FIG. 14 is a schematic structural diagram of an authentication function entity according to an embodiment of this application.

FIG. 14 is a schematic structural diagram of an authentication function entity according to an embodiment of this application. As shown in FIG. 14, the authentication function entity includes a transceiver 141, a memory 142, a processor 143, and at least one communications bus 144.

The memory 142 stores a software program, the memory 142 may include a high-speed RAM memory, and may further include a non-volatile memory NVM, for example, at least one magnetic disk memory, and the memory 142 may store various programs, to complete various processing functions and implement method steps in this embodiment. The processor 143 is coupled to the memory 142, and the communications bus 144 is configured to implement communication connection between elements. Optionally, the transceiver 141 in this embodiment may be a radio frequency module, a baseband module, or a communication interface module on a network device.

In this embodiment, the transceiver 141 is configured to receive a fourth message sent by an AMF entity, where the fourth message is used to request a key, the fourth message may be a key request message, and the fourth message includes an identifier of a terminal device. The processor 143 is configured to derive a third key ($K_{AUF}'$) based on a key ($K_{AUF}$) shared between an authentication function entity and the terminal device. The transceiver 141 is further configured to send a fifth message to the target AMF entity, where the fifth message is used to respond to the fourth message, the fifth message may be a key response message, and the fifth message carries the third key ($K_{AUF}'$).

For example, the key ($K_{AUF}$) shared between the authentication function entity and the terminal device is an EMSK, or a key generated based on an EMSK, or a key generated based on a CK and an IK.

Optionally, in actual application, the processor 143 may be configured to derive the third key ($K_{AUF}'$) using a KDF based on the key ($K_{AUF}$) shared between the authentication function entity and the terminal device.

Optionally, in actual application, the processor 143 may be configured to derive the third key ($K_{AUF}'$) using a KDF based on the key ($K_{AUF}$) shared between the authentication function entity and the terminal device and a random number of the terminal device.

Optionally, the fourth message may carry the random number of the terminal device.

Optionally, in actual application, the processor 143 may be configured to derive the third key ($K_{AUF}'$) using a KDF based on the key ($K_{AUF}$) shared between the authentication function entity and the terminal device and a random number of the authentication function entity.

The authentication function entity provided in this embodiment can perform functions performed by the authentication function entity in the foregoing method embodiment. An implementation principle and a technical effect of this embodiment are similar to those of the method embodiment and are not described herein again.

Figure 15:
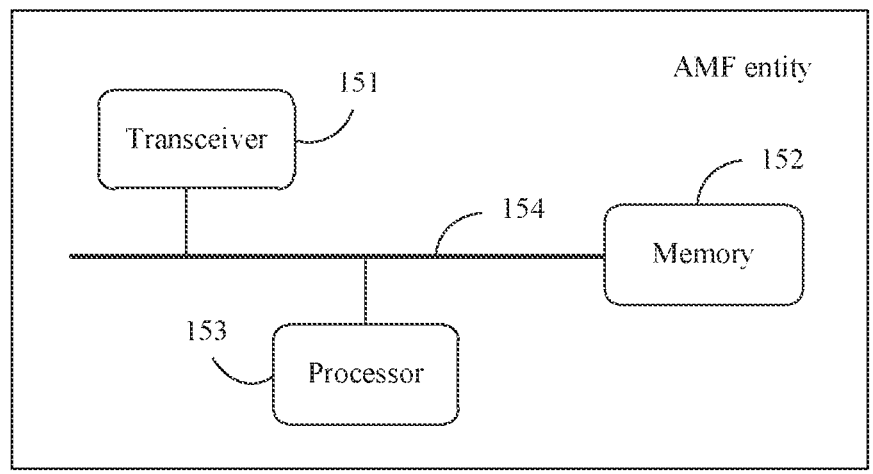
FIG. 15 is a schematic structural diagram of an AMF entity according to an embodiment of this application.

FIG. 15 is a schematic structural diagram of an AMF entity according to an embodiment of this application. As shown in FIG. 15, the AMF entity includes a transceiver 151, a memory 152, a processor 153, and at least one communications bus 154.

The memory 152 stores a software program, the memory 152 may include a high-speed RAM memory, and may further include a non-volatile memory NVM, for example, at least one magnetic disk memory, and the memory 152 may store various programs, to complete various processing functions and implement method steps in this embodiment. The processor 153 is coupled to the memory 152, and the communications bus 154 is configured to implement communication connection between elements. Optionally, the transceiver 151 in this embodiment may be a radio frequency module, a baseband module, or a communication interface module on a network device.

In this embodiment, the transceiver 151 is configured to receive a second message from a target AMF entity, where the second message is used to request a security context of a terminal device, the second message may be an information request message, and the second message includes an identifier of the terminal device. The processor 153 is configured to derive a first key ($K_{oAMF}'$) based on a key ($K_{oAMF}$) between the AMF entity and the terminal device. The transceiver 151 is further configured to send a third message to the target AMF entity, where the third message is used to respond to the second message, the third message is used to send the security context of the terminal device to the target AMF entity, the third message may be an information response message, and the third message carries the first key ($K_{oAMF}'$).

For example, the key between the source AMF entity and the terminal device includes a communication key between the source AMF entity and the terminal device or a key shared between the source AMF entity and the terminal device, and the key shared between the source AMF entity and the terminal device is an MSK, or a key generated based on an MSK, or a key generated based on a CK and an IK.

Optionally, in actual application, the processor 153 may be configured to derive the first key ($K_{oAMF}'$) using a KDF based on the key ($K_{oAMF}$) between the AMF entity and the terminal device.

Optionally, in actual application, the processor 153 may be configured to derive the first key ($K_{oAMF}'$) using a KDF based on the key ($K_{oAMF}$) between the AMF entity and the terminal device and a random number of the terminal device.

Optionally, the second message may carry the random number of the terminal device.

Optionally, in actual application, the processor 153 may be configured to derive the first key ($K_{oAMF}'$) using a KDF based on the key ($K_{oAMF}$) between the AMF entity and the terminal device and a random number of the AMF entity.

The AMF entity provided in this embodiment can perform functions performed by the source AMF entity in the foregoing method embodiment. An implementation principle and a technical effect of this embodiment are similar to those of the method embodiment and are not described herein again.

In addition, an embodiment of this application further provides a plurality of communications systems.

A first communications system includes a target AMF entity having the key obtaining apparatus provided in the foregoing embodiment shown in FIG. 6 or FIG. 7, a source AMF entity having the key obtaining apparatus provided in the foregoing embodiment shown in FIG. 9, an authentication function entity having the key obtaining apparatus provided in the foregoing embodiment shown in FIG. 10, and a terminal device having the key obtaining apparatus provided in the foregoing embodiment shown in FIG. 8.

A second communications system includes the target AMF entity provided in the foregoing embodiment shown in FIG. 11 or FIG. 12, the source AMF entity provided in the foregoing embodiment shown in FIG. 15, the authentication function entity provided in the foregoing embodiment shown in FIG. 14, and the terminal device provided in the foregoing embodiment shown in FIG. 13.

The methods or algorithm steps described with reference to the content disclosed in this application may be implemented by hardware, may be implemented by a processor by executing a software instruction, or may be implemented using a computer program product. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. A storage medium used as an example is coupled to the processor, such that the processor can read information from the storage medium, and can write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

Persons skilled in the art should be aware that in one or more of the foregoing examples, the functions described in this application may be implemented using hardware, software, firmware, or any combination thereof. When implemented by software, these functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general-purpose or dedicated computer.

In the embodiments provided in this application, it should be understood that the disclosed system, device and method may be implemented in other manners without departing from the scope of this application. For example, the described embodiment is merely an example. For example, the module or unit division is merely logical function division and may be other division in actual implementation. For example, a plurality of units or components may be combined or integrated into another system, or some features may be ignored or not performed. The units described as separate parts may be or may not be physically separate, and parts displayed as units may be or may not be physical units, may be located in one position, or may be distributed on a plurality of network units. Some or all of the modules may be selected based on actual needs to achieve the objectives of the solutions of the embodiments. Persons of ordinary skill in the art may understand and implement the embodiments of this application without creative efforts.

In addition, the schematic diagrams illustrating the system, device, method, and different embodiments may be combined or integrated with other systems, modules, technologies or methods without departing from the scope of this application. In addition, the displayed or discussed mutual couplings or direct couplings or communication connection may be implemented through some interfaces. The indirect couplings or communication connection between the apparatuses or units may be implemented in electronic, mechanic, or other forms.

It can be understood that "a plurality of" in the embodiments of this application refers to two or more than two. Descriptions such as "first" and "second" in the embodiments of this application are merely used for indicating and distinguishing between objects, do not show a sequence, do not represent that a quantity of devices or messages is limited in the embodiments of this application, for example, there may be one or more first keys, and do not constitute any limitation on the embodiments of this application.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method for security handling in mobility of a terminal device, comprising:
   receiving, by a target access and mobility management function (AMF) entity, a first message for registering the terminal device;
   sending, by the target AMF entity, a second message to a source AMF entity after receiving the first message, wherein the second message includes an identifier of the terminal device;
   deriving, by the source AMF entity, a first key based on a key between the source AMF entity and the terminal device, wherein the first key is used to derive a communication key, which is used to encrypt signaling between the target AMF entity and the terminal device;
   sending, by the source AMF entity, the first key to the target AMF entity;
   determining, by the target AMF entity after receiving the first key, whether to use the first key based on security related information; and
   determining, by the target AMF entity after determining to use the first key, the communication key between the target AMF entity and the terminal device based on the first key.

2. The method according to claim 1, further comprising sending, by the target AMF entity, to the terminal device, a non-access stratum security mode command (NAS SMC) that carries indication information instructing the terminal device to derive the first key.

3. The method according to claim 2, further comprising:
   receiving, by the terminal device, the NAS SMC;
   deriving, by the terminal device, the first key based on the key between the source AMF entity and the terminal device; and
   deriving, by the terminal device, the communication key between the terminal device and the target AMF entity according to the first key.

4. The method according to claim 1, wherein the security related information comprises key isolation information of the target AMF entity or a security status of the source AMF entity.

5. The method according to claim 1, wherein the security related information comprises a preconfigured policy that indicates to use the first key received from the source AMF entity.

6. The method according to claim 1, wherein the second message is for requesting a security context of the terminal device.

7. The method according to claim 1, wherein the first key comprises $K_{oAMF}'$, wherein deriving the first key comprises deriving, by the source AMF entity, the $K_{oAMF}'$ based on a key ($K_{oAMF}$) between the source AMF entity and the terminal device, and wherein the $K_{oAMF}'$ is used to derive the communication key, which is used to perform integrity protection processing on signaling between the UE and the target AMF entity.

8. A method for security handling in mobility of a terminal device, comprising:
   receiving, by a target access and mobility management function (AMF) entity, a first message for registering the terminal device;
   sending, by the target AMF entity, a second message to a source AMF entity after receiving the first message, wherein the second message includes an identifier of the terminal device;
   deriving, by the source AMF entity, a first key based on a key between the source AMF entity and the terminal device, wherein the first key is used to derive a communication key, which is used to encrypt signaling between the target AMF entity and the terminal device;
   sending, by the source AMF entity, the first key to the target AMF entity;
   determining, by the target AMF entity after receiving the first key, whether to use the first key based on security related information;
   sending, by the target AMF entity, a key request message to an authentication function entity after determining not to use the first key;

deriving, by the authentication function entity, a second key based on a shared key between the authentication function entity and the terminal device;

sending, by the authentication function entity, the second key to the target AMF entity; and determining, by the target AMF entity, a communication key between the target AMF entity and the terminal device based on the second key.

9. The method according to claim 8, further comprising sending, by the target AMF entity, to the terminal device, a non-access stratum security mode command (NAS SMC) that carries indication information instructing the terminal device to derive the communication key between the terminal device and the target AMF entity.

10. The method according to claim 9, further comprising:

receiving, by the terminal device, the NAS SMC; and deriving, by the terminal device, the communication key based on the shared key between the terminal device and the authentication function entity.

11. The method according to claim 8, wherein the security related information comprises key isolation information of the target AMF entity or a security status of the source AMF entity.

12. The method according to claim 8, wherein the security related information comprises a preconfigured policy that indicates to use the first key received.

13. The method according to claim 8, wherein the second message is for requesting a security context of the terminal device.

14. A communication system, comprising:

a target access and mobility management function (AMF) entity; and a source AMF entity coupled to the target AMF entity, wherein the target AMF entity is configured to:

receive a first message for registering a terminal device; and send a second message to the source AMF entity after receiving the first message, wherein the second message includes an identifier of the terminal device, wherein the source AMF entity is configured to:

derive a first key based on a key between the source AMF entity and the terminal device; and send the first key to the target AMF entity, wherein the first key is used to derive a communication key, which is used to encrypt signaling between the target AMF entity and the terminal device, and wherein the target AMF entity is further configured to:

determine whether to use the first key based on security related information after receiving the first key; and derive the communication key based on the first key after determining to use the first key.

15. The communication system according to claim 14, wherein the target AMF entity is configured to send to the terminal device a non-access stratum security mode command (NAS SMC) that carries indication information instructing the terminal device to derive the first key.

16. The communication system according to claim 14, wherein the security related information comprises key isolation information of the target AMF entity or a security status of the source AMF entity.

17. The communication system according to claim 14, wherein the security related information comprises a preconfigured policy that indicates to use the first key received from the source AMF entity.

18. The communication system according to claim 14, wherein the second message is for requesting a security context of the terminal device.

19. The communication system according to claim 14, wherein the first key comprises $K_{oAMF}'$, wherein the source AMF entity is configured to derive the $K_{oAMF}'$ based on a key ($K_{oAMF}$) between the source AMF entity and the terminal device, and wherein the $K_{oAMF}'$ is used to derive the communication key, which is used to perform integrity protection processing on signaling between the UE and the target AMF entity.

20. A communication system, comprising:

a target access and mobility management function (AMF) entity;

a source AMF entity coupled to the target AMF entity; and an authentication function entity coupled to the target AMF entity, wherein the target AMF entity is configured to:

receive a first message for registering a terminal device; and send a second message to the source AMF entity after receiving the first message, wherein the second message includes an identifier of the terminal device, wherein the source AMF entity is configured to:

derive a first key based on a key between the source AMF entity and the terminal device; and send the first key to the target AMF entity, wherein the first key is used to derive a communication key, which is used to encrypt signaling between the target AMF entity and the terminal device, wherein the target AMF entity is further configured to:

determine whether to use the first key based on security related information after receiving the first key; and send a key request message to the authentication function entity after determining not to use the first key, wherein the authentication function entity is configured to:

derive a second key based on a shared key between the authentication function entity and the terminal device; and send the second key to the target AMF entity, and wherein the target AMF entity is further configured to determine a communication key between the target AMF entity and the terminal device based on the second key.

21. The communication system according to claim 20, wherein the target AMF entity is further configured to send to the terminal device a non-access stratum security mode command (NAS SMC) that carries indication information instructing the terminal device to derive the communication key.

22. The communication system according to claim 20, wherein the security related information comprises key isolation information of the target AMF entity or a security status of the source AMF entity.

23. The communication system according to claim 20, wherein the security related information comprises a preconfigured policy that indicates to use the first key received from the source AMF entity.

24. The communication system according to claim 20, wherein the second message is for requesting a security context of the terminal device.

* * * * *